US012703385B2

(12) United States Patent
Schaefer

(10) Patent No.: US 12,703,385 B2
(45) Date of Patent: Aug. 11, 2026

(54) SYSTEMS AND METHODS FOR LATERAL POSITION-BASED TRACE CLUSTERING

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 227 days.

(21) Appl. No.: 18/428,350

(22) Filed: Jan. 31, 2024

(65) Prior Publication Data

US 2025/0242831 A1 Jul. 31, 2025

(51) Int. Cl.
*B60W 60/00* (2020.01)
*B60W 30/18* (2012.01)
*G01C 21/00* (2006.01)

(52) U.S. Cl.
CPC ....... *B60W 60/001* (2020.02); *G01C 21/3822* (2020.08); *B60W 30/18159* (2020.02); *B60W 2552/10* (2020.02); *B60W 2556/40* (2020.02)

(58) Field of Classification Search
CPC ......... B60W 60/001; B60W 30/18159; B60W 2552/10; B60W 2556/40; B60W 2554/408; B60W 2556/10; G01C 21/3822
See application file for complete search history.

(56) References Cited

U.S. PATENT DOCUMENTS 6,385,539 B1 5/2002 Wilson et al.
8,566,021 B2 10/2013 Smartt
9,816,823 B2 11/2017 Wang et al.
9,874,447 B2 1/2018 Phuyal et al.
10,359,295 B2 7/2019 Stroila et al.
10,546,400 B2 1/2020 Dorum
10,761,535 B2 9/2020 Chen et al.
10,832,635 B2 11/2020 Cheng et al.
10,859,395 B2 12/2020 Wheeler et al.
11,127,292 B2 9/2021 Bai et al.
11,420,649 B2 8/2022 Dorum et al.
(Continued)

FOREIGN PATENT DOCUMENTS

EP 1857780 B1 5/2020

OTHER PUBLICATIONS

Jones et al. "Lane-Level Route Planning for Autonomous Vehicles", International Workshop on the Algorithmic Foundations of Robotics. pp 312-327. 2022.

*Primary Examiner* — Russell Frejd
*Assistant Examiner* — Chanmin Park
(74) *Attorney, Agent, or Firm* — Christopher G. Darrow; Darrow Mustafa PC

(57) ABSTRACT

Systems, methods, and other embodiments described herein relate to generating driving trajectories for routes along a road based on vehicle traces through lane gates. In one embodiment, a method includes generating a network of lane gates across a representation of a road. The method also includes, for a target lane gate, 1) clustering vehicle traces passing through the target lane gate based on a trace lateral position at the target lane gate and 2) placing a node for a cluster on the target lane gate at a representative lateral position for the cluster. The method also includes generating a driving trajectory for a path by connecting nodes on adjacent lane gates that share a vehicle trace.

18 Claims, 11 Drawing Sheets

(56) References Cited

U.S. PATENT DOCUMENTS

| | | | | |
|---|---|---|---|---|
| 11,578,982 | B2 | 2/2023 | Milici | |
| 11,609,095 | B2 | 3/2023 | Andréoli et al. | |
| 11,619,943 | B2 | 4/2023 | Jing et al. | |
| 11,704,897 | B2 | 7/2023 | Soni et al. | |
| 11,796,342 | B2 | 10/2023 | Daniel | |
| 11,808,581 | B2 | 11/2023 | Hansson et al. | |
| 2014/0095062 | A1 | 4/2014 | Wang et al. | |
| 2018/0240335 | A1 | 8/2018 | Dong et al. | |
| 2021/0403001 | A1* | 12/2021 | Del Pero | G01C 21/3841 |
| 2022/0161817 | A1 | 5/2022 | Anastassov | |
| 2022/0207996 | A1 | 6/2022 | Xu et al. | |
| 2023/0126317 | A1 | 4/2023 | Millington | |
| 2023/0244237 | A1 | 8/2023 | Jing et al. | |

* cited by examiner

SYSTEMS AND METHODS FOR LATERAL POSITION-BASED TRACE CLUSTERING

TECHNICAL FIELD

The subject matter described herein relates, in general, to generating driving trajectories for autonomous driving vehicles and, more particularly, to generating driving trajectories based on vehicle lateral positions at various points along a route.

BACKGROUND

Some vehicles have systems and devices that allow for semi-autonomous or autonomous vehicle control. An autonomous vehicle is controlled and/or maneuvered along a travel route via a computing system with minimal or no input from a human driver. For example, the computing system may control the longitudinal and lateral movement of the vehicle as it traverses a roadway based on sensor data collected from the onboard vehicle and environmental sensors. In a semi-autonomous vehicle, the computing system provides a portion of the control and/or maneuvering of the vehicle along a travel route, with a vehicle operator directing some of the control and/or maneuvering of the vehicle. As an example, a semi-autonomous vehicle may perform adaptive cruise control where, after initiation and setting of cruise control of a vehicle by an operator, the computing system adjusts the following speed of the ego vehicle based on the distance and quantity of vehicles in front of the ego vehicle.

SUMMARY

In one embodiment, example systems and methods relate to a manner of improving the generated driving trajectories for an autonomous vehicle by generating driving trajectories based on roadway lane gates and vehicle lateral positions at various points along a route. The driving trajectories are based on clustered traces of vehicles that have traversed the same route that the autonomous vehicle is to follow.

In one embodiment, a trajectory generation system for generating autonomous vehicle driving trajectories based on vehicle trace clusters is disclosed. The trajectory generation system includes one or more processors and a memory communicably coupled to the one or more processors. The memory stores instructions that, when executed by the one or more processors, cause the one or more processors to generate a network of lane gates across a representation of a road. The memory also stores instructions that, when executed by the one or more processors, cause the one or more processors to, for a target lane gate in the network, 1) cluster vehicle traces passing through the target lane gate based on a trace lateral position at the target lane gate and 2) place a node for a cluster on the target lane gate at a representative lateral position for the cluster. The memory also stores instructions that, when executed by the one or more processors, cause the one or more processors to generate a driving trajectory for a path by connecting nodes on adjacent lane gates that share a vehicle trace.

In one embodiment, a non-transitory computer-readable medium for generating autonomous vehicle driving trajectories based on clustered vehicle traces is disclosed and including instructions that, when executed by one or more processors, cause the one or more processors to perform one or more functions is disclosed. The instructions include instructions to generate a network of lane gates across a representation of a road. The instructions also include instructions to, for a target lane gate in the network, 1) cluster vehicle traces passing through the target lane gate based on a trace lateral position at the target lane gate and 2) place a node for a cluster on the target lane gate at a representative lateral position for the cluster. The instructions also include instructions to generate a driving trajectory for a path by connecting nodes on adjacent lane gates that share a vehicle trace.

In one embodiment, a method for generating autonomous vehicle driving trajectories based on clustered vehicle traces is disclosed. In one embodiment, the method includes generating a network of lane gates across a representation of a road. The method also includes, for a target lane gate in the network, 1) clustering vehicle traces passing through the target lane gate based on a trace lateral position at the target lane gate and 2) placing a node for a cluster on the target lane gate at a representative lateral position for the cluster. The method also includes generating a driving trajectory for a path by connecting nodes on adjacent lane gates that share a vehicle trace.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
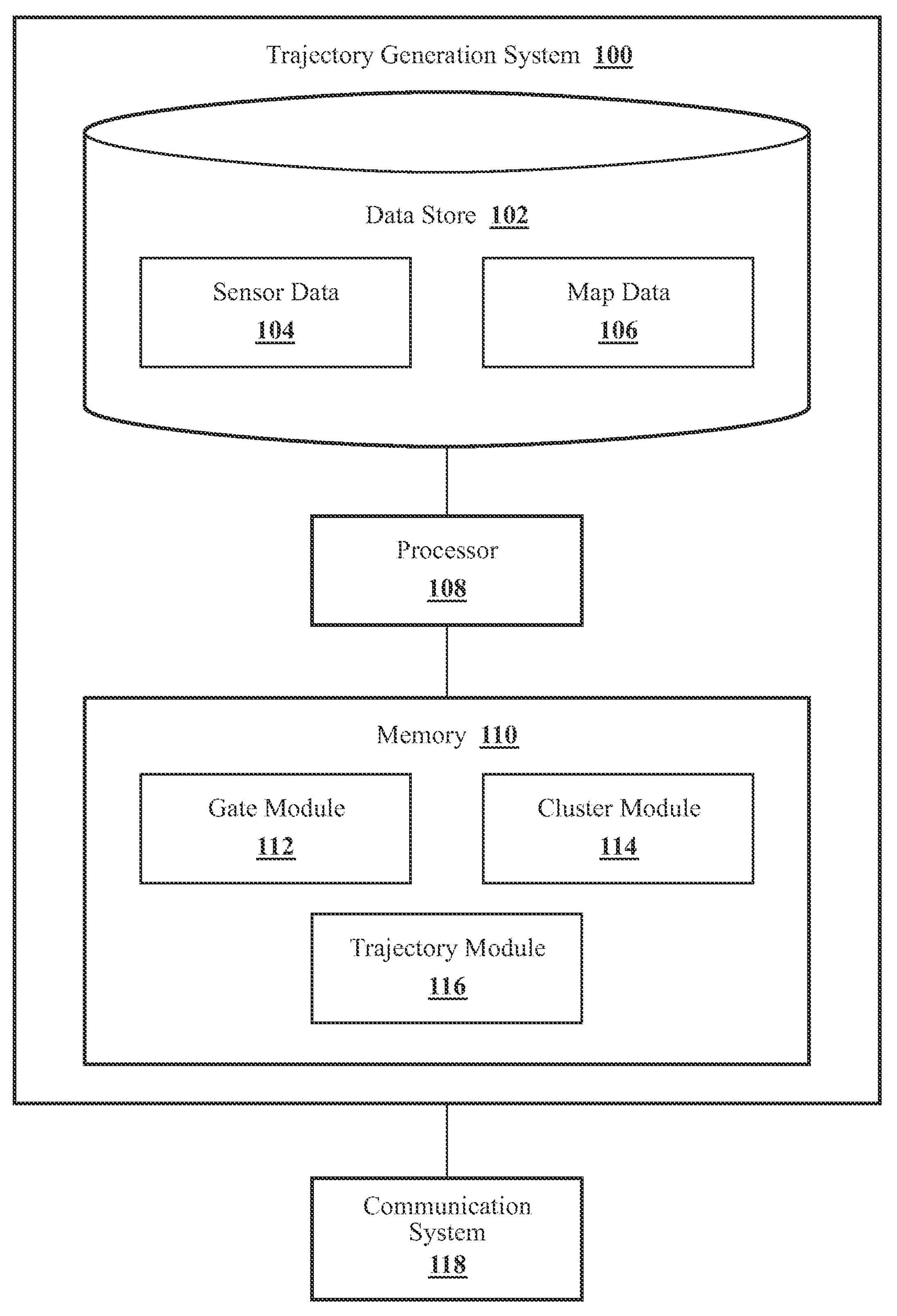
FIG. 1 illustrates one embodiment of a trajectory generation system that is associated with generating vehicle lateral position-based driving trajectories for regions of a road network.

Systems, methods, and other embodiments disclosed herein improve driving trajectories for autonomous vehicles through road intersections by basing such on the combination of traces, or paths, of manually-controlled vehicles that have already traversed the road on which the autonomous vehicle is found. As previously described, autonomous or semi-autonomous operation of a vehicle entails at least partially controlling a vehicle with a computing system rather than driver input. For example, in an autonomous vehicle, the computing system may control the longitudinal and lateral movement of the vehicle as it traverses a roadway between an origin and a desired destination.

Currently, the generation of driving trajectories may be performed manually, for example, as technicians manually generate the driving trajectories based on map data and/or the observation of vehicles during a training phase. Given the increased number and complexity of roadways, which may have multiple lanes that merge, intersect, and/or divide, identifying a driving trajectory for an extensive road network, such as an entire urban city, is time-intensive and complex.

The trajectory generation system of the present specification generates driving trajectories for autonomous vehicles based on routes taken by manually operated vehicles. That is, manually operated vehicles take specific routes along roadways. The present trajectory generation system compiles the vehicle traces associated with these routes and generates a driving trajectory based on such.

Specifically, the trajectory generation system identifies driving trajectories for autonomous vehicles based on lane gates, or intermediate checkpoints within the lanes, established along the roadway. In an example, portions of a road may be defined by map data. Other portions of the road may not be defined by map data. The trajectory generation system of the present specification generates driving trajectories for both the map-defined portions of the road and the portions of the road that are not defined by map data. In either case, the trajectory generation system generates a network of lane gates per path through a roadway.

For portions of the road defined by map data, lane gates are generated across lane geometries as defined in the map data. For portions of the road not defined by map data, the trajectory generation system generates reference paths that serve as the basis for the lane gates. Specifically, for unmapped regions of a road, the trajectory generation system receives vehicle traces and combines (e.g., averages or takes the median of) subsets of the vehicle traces based on their entrance to and exit from a region (e.g., an intersection) and generates a reference path for paired entrances and exits of the region. That is, the system receives vehicle traces from multiple vehicles, and based on the vehicle traces, the trajectory generation system generates trace segments, a trace segment being a contiguous subset of a trace that starts where the vehicle has left one map-defined lane polygon into an unmapped region and ends where the trace enters another map-defined lane polygon. As such, the trace segment represents the portions of the vehicle trace in an unmapped region. The system then groups trace segments based on which pair of lane polygons (e.g., transitions in FIGS. 4A-4G) the trace segments are connected to. For each trace segment group, the system estimates a reference path centerline. Specifically, the trajectory generation system may sample each segment at n equidistant locations between a start and an end, with n being the same for all trace segments in the group. The trajectory generation system may then average all first sampling points of a group, all second sampling points of a group, etc., and connect them to form a reference path centerline. The system then partitions the reference path into equidistant segments via various lane gates.

In either case (e.g., lane gate generation through mapped or unmapped regions), for each lane gate, the trajectory generation system clusters vehicle traces based on 1) the lateral position of the vehicle traces as they intersect with the lane gate and 2) an additional characteristic of the vehicle from which the trace originated. Examples of additional characteristics include the heading angle (i.e., the orientation of the vehicle relative to a reference direction such as north) indicated by the vehicle traces at the intersection point with the lane gate, the time of day, and the vehicle speed. As a specific example, the trajectory generation system clusters together those vehicle traces with 1) vehicle lateral positions within a threshold distance from one another and 2) vehicle heading angles within a threshold angular difference from one another. For each cluster, the trajectory generation system combines-averages or calculates the median of—the lateral position of the vehicle traces at each lane gate and places a per-cluster node at the target lane gate at a location of the cluster lateral position. The trajectory generation system then connects nodes on adjacent lane gates with shared or common vehicle traces to form the driving trajectory. For example, a first vehicle trace may be grouped in a first cluster on a first gate represented by a first node. This first vehicle trace may be grouped with a cluster on a second gate represented by a second node on the second gate. The trajectory generation system joins the first node on the first gate with the second node on the second gate because both represent the first vehicle trace. The nodes on different lane gates that are representative of the first vehicle trace are similarly joined to form a driving trajectory. As such, rather than generating a driving trajectory based on a horizon of lane gates, the present system generates a driving trajectory by connecting nodes with shared or common vehicle traces.

A driving trajectory generated based on vehicle traces, as described above, can provide navigation and/or autonomous control based on manually operated vehicle routes, even in regions where roads may not be completely mapped.

In an example, in addition to generating driving trajectories for the paths based on the vehicle traces, the system may identify other vehicle attributes based on the clustered vehicle traces. For example, the system may identify the average or median speed of the vehicles at different points, the headlight state, the windshield wiper state, and/or other operational characteristics of the vehicles for which the vehicle traces are clustered. A vehicle computing system may then rely on the trajectory and vehicle attributes to 1) guide the autonomous vehicle along the trajectory and/or 2) establish vehicle settings for the autonomous vehicle at different points along the trajectory.

In this way, the disclosed systems, methods, and other embodiments improve the generation of autonomous vehicle trajectories by basing such on actual and historic driving behaviors of many operators rather than manually curated and entered settings. Moreover, the present systems, methods, and other embodiments can generate driving trajectories through unmapped regions and mapped regions such that autonomous control of vehicles and/or navigation of vehicles is possible even on roads not represented in map data. As such, the trace-curated trajectories are based on the real-world variety of driving paths to generate smooth driving trajectories.

As used herein, a “vehicle” is any form of transport that may be motorized or otherwise powered. In one or more implementations, the vehicle is an automobile. While arrangements will be described herein with respect to automobiles, it will be understood that embodiments are not limited to automobiles. In some implementations, the vehicle may be a robotic device or a form of transport that, for example, includes sensors to perceive aspects of the surrounding environment, and thus benefits from the functionality discussed herein associated with generating driving trajectories based on past vehicle traces.

It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the trajectory generation system that is implemented to perform methods and other functions as disclosed herein relating to improving driving trajectories that are followed by autonomous vehicles.

FIG. 1 illustrates one embodiment of a trajectory generation system 100 that is associated with generating vehicle lateral position-based driving trajectories for regions of a road network. The trajectory generation system 100 is shown as including a processor 108 that executes instructions to perform the various functions disclosed herein. Additional details regarding the processor 108 are described below in connection with FIG. 5.

In one embodiment, the trajectory generation system 100 includes a memory 110 that stores a gate module 112, a cluster module 114, and a trajectory module 116. The memory 110 is a random-access memory (RAM), read-only memory (ROM), a hard-disk drive, a flash memory, or another suitable memory for storing the modules 112, 114, and 116. The modules 112, 114, and 116 are, for example, computer-readable instructions that when executed by the processor 108 cause the processor 108 to perform the various functions disclosed herein. In alternative arrangements, the modules 112, 114, and 116 are independent elements from the memory 110 that are, for example, comprised of hardware elements. Thus, the modules 112, 114, and 116 are alternatively application-specific integrated circuits (ASICs), hardware-based controllers, a composition of logic gates, or another hardware-based solution.

Moreover, in one embodiment, the trajectory generation system 100 includes the data store 102. The data store 102 is, in one embodiment, an electronic data structure stored in the memory 110 or another data storage device and that is configured with routines that can be executed by the processor 108 for analyzing stored data, providing stored data, organizing stored data, and so on. Thus, in one embodiment, the data store 102 stores data used by the modules 112, 114, and 116 in executing various functions.

In one embodiment, the data store 102 stores the sensor data 104 upon which the driving trajectories are generated. As described above, the driving trajectory provided to the autonomous vehicle is based on data collected by vehicles that have previously traversed the route that the autonomous vehicle is to follow. As such, the sensor data 104 includes the data collected by multiple vehicles' sensor systems as they traverse the route. Specifically, the data store 102 may include the vehicle traces for various vehicles. A vehicle trace records vehicle motion state/behavior, including location, date, time, speed, and other information. At each lane gate, vehicle traces are grouped based on 1) the lateral position of the vehicle indicated in the vehicle traces and 2) an additional vehicle characteristic, of which the heading angle of the vehicle is an example.

The sensor data 104 may include longitude and latitude coordinates or any other information indicative of the positioning of a vehicle. In an example, the lateral position may be indicated via geographic coordinates, such as global positioning system (GPS) coordinates. As another example, the positional information may indicate the vehicle's position relative to the road, such as its distance from the edge of the roadway and/or from the edge of a lane. In an example, the cluster module 114 may convert the geographic coordinates into a frame of reference of the lane.

In an example, the sensor data 104 may include the heading angle. In another example, the cluster module 114 calculates the heading angle based on the location information (e.g., the geographic coordinates) in the sensor data 104.

While specific reference is made to clustering based on the lateral position of the vehicle and the vehicle heading, the clustering may be based on the lateral position and some other vehicle characteristics defined by a vehicle sensor. Examples include vehicle speed and time of day, among others. As such, the sensor data 104 may include sensor output indicating the additional vehicle characteristic by which vehicle traces are clustered. Other examples include data that is indicative of the state of a vehicle system, as described below.

The sensor data 104 may include the output of the environment and vehicle sensors of the vehicle. In general, the vehicle sensors sense information about the vehicle itself. In one or more arrangements, the vehicle sensor(s) include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle.

As a particular example, the sensor data 104 may include data indicative of the state of various vehicle systems. The state of these systems at various lane gates along a roadway may be used to control the operation of the associated systems of the autonomous vehicle. For example, while traveling through a tunnel along a roadway, motorists or a computing system of an autonomous vehicle may activate the headlights of the vehicle. Data indicative that the headlights are activated, when combined with similar data from other vehicles traveling through the tunnel, may be used to automatically turn on the headlights of the autonomous vehicle as it travels through the tunnel.

As another example, vehicle speed may be recorded over time. In an example, the averaged speed value of multiple vehicles that are grouped may be used to set the speed of an autonomous vehicle that is traveling along the same section of road as the grouped vehicles. As such, the sensor data 104 may include this information (e.g., the position of the vehicle, speed of the vehicle, state of a variety of vehicle systems) and other information collected by the sensor system of the vehicle. While particular reference is made to particular sensor data 104, the data store 102 may store a variety of types of sensor data 104 that is collected from vehicle sensors and relied on by the trajectory generation system 100 to generate a driving trajectory for the autonomous vehicle and/or to operate vehicle systems of the autonomous vehicle.

In one embodiment, the data store 102 stores the sensor data 104 along with, for example, metadata that characterizes various aspects of the sensor data 104. For example, the metadata can include time/date stamps from when the separate sensor data 104 was generated and may include identifiers of the sensor data 104 such that the sensor data 104 may be associated with a trace and/or vehicle to which it pertains.

In one embodiment, the data store 102 further includes map data 106. As described above, the trajectory generation system 100 generates lane gates, or divisions, across a roadway. As such, the data store 102 includes the map data 106 across which the lane gates are generated and for which the driving trajectories are generated. The map data 106 is a map of the roadways across a particular region or area and may indicate the connectivity and topology of the road network. As described above, portions of a road network may be unrepresented in the map data 106. For example, intersections of roads may not be indicated in the map data 106 associated with a road network. This lack of intersection mapping may make autonomous control through an intersection difficult as some autonomous control systems rely on map data 106 to guide the autonomous vehicle. The trajectory generation system 100 of the present specification provides navigation/autonomous control through intersections and other unmapped road regions in addition to providing driving trajectories, upon which navigation/autonomous control are based, through mapped regions as well. Additional details regarding the generation of lane gates are provided below in connection with FIGS. 4A-4D.

The trajectory generation system 100 also includes the modules 112, 114, and 116 that, when executed by the processor 108, cause the processor 108 to perform the various functions disclosed herein. Specifically, the trajectory generation system 100 includes a gate module 112 that includes instructions that cause the processor 108 to generate a network of lane gates across a representation of a road. That is, as described above, each lane of a road, whether mapped or unmapped, is divided into segments by lane gates. These lane gates serve as the basis by which vehicle traces are clustered together. For example, vehicle traces at a lane gate may be clustered based on their respective lateral position and heading angles measured at the lane gate. However, as described above, generating a lane gate becomes complicated when there is no map representation of a lane, as may be the case in road intersections. Accordingly, the gate module 112 generates lane gates through an unmapped portion of a road by 1) generating a reference path for an unmapped region that is bound between two mapped regions, 2) generating boundaries for the reference path, and 3) generating equidistant lane gates along the reference path, with a width of a lane gate spanning the lane boundaries. Additional details regarding the generation of the network of lane gates are provided below in connection with FIGS. 4A-4D.

The trajectory generation system 100 also includes a cluster module 114 that includes instructions that cause the processor 108 to, for each target lane gate in the network, 1) cluster vehicle traces passing through the target lane gate based on 1) a trace lateral position at the target lane gate. In an example, the cluster module 114 includes instructions that cause the processor 108 to cluster the vehicle traces passing through the target lane gate based on 1) the trace lateral position at the target lane gate and 2) an additional vehicle characteristic indicated by the vehicle traces. As described above, the additional vehicle characteristic may be any vehicle characteristic defined by a sensor system output. Examples include vehicle speed, vehicle acceleration, time of day, weather, etc.

Figure 4A:
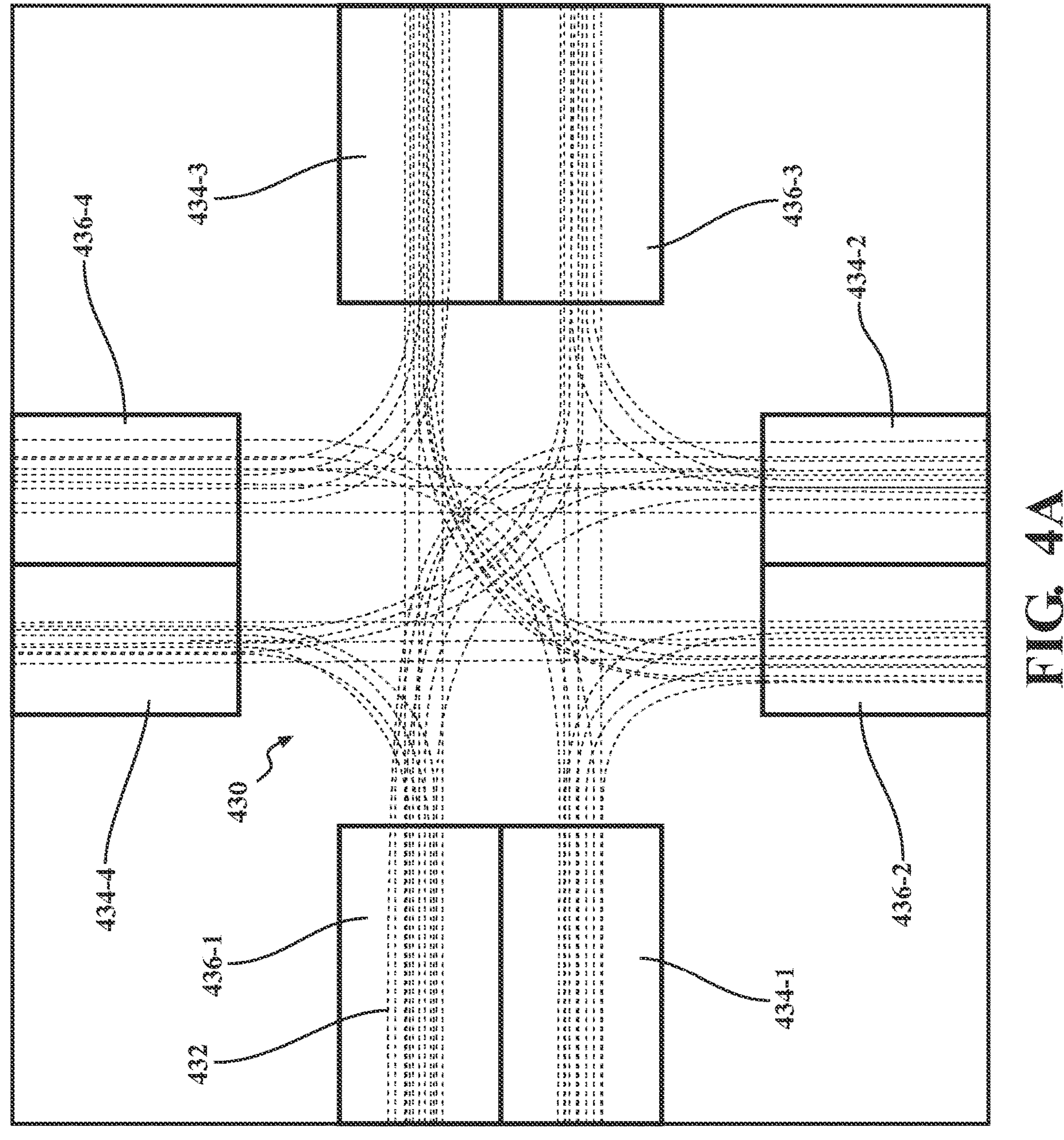
FIGS. 4A-4G depict the trace and gate-based generation of a driving trajectory for a portion of a road.

In one particular example, the cluster module 114 includes instructions that cause the processor 108 to cluster vehicle traces passing through the target lane gate based on 1) the trace lateral position at the target lane gate and 2) a trace heading angle at the target lane gate. That is, as a vehicle traverses a roadway, it passes the target lane gate at a particular lateral position (e.g., a particular distance from an edge of the lane) and a particular heading angle (i.e., orientation relative to a reference angle such as true north). Similar lateral positions and heading angles within different vehicle traces may indicate that the associated vehicles have traveled similar routes. For example, as depicted in FIG. 4A, at some points in time, vehicles traveling straight through an intersection from one lane may have a similar lateral position as vehicles turning from the same lane. However, the straight traveling vehicles may have a different heading angle from a turning vehicle. As such, the lateral position and heading angle together provide a clustering basis that may differentiate vehicles traveling along different routes and for which different driving trajectories should be generated.

Were the clustering not based on two factors, false positives may arise where a vehicle traveling along a first path (e.g., a straight path) is clustered with a vehicle traveling a second path (e.g., a curved path). If clustered, reliance on sensor data associated with the first path (i.e., a straight path) may skew any driving trajectory or/additional control data generated for and associated with the second path (i.e., the curved path). For example, the recorded speed of a vehicle traveling along the straight path may be greater than that of a vehicle traveling along the curved path. As such, the greater straight path speed may artificially increase the representative vehicle speed used to guide the autonomous vehicle around the curved path, which may cause the autonomous vehicle to navigate the turn at too great a speed. As such, the cluster module 114, by performing a two-factor, or two-dimensional, clustering prevents the false positive clustering of vehicle traces.

The cluster module 114 also includes instructions that cause the processor 108 to place a node for a cluster on the target lane gate at a representative lateral position for the cluster. That is, the cluster module 114 also determines the lateral position of the cluster based on the lateral positions of the individual vehicle traces in the cluster. This representative lateral position serves as a node of the driving trajectory at this lane gate. Additional details regarding trace clustering and the calculation of the representative lateral position of the cluster at the lane gate are provided below in connection with FIGS. 4E and 4F.

In one approach, the cluster module 114 implements and/or otherwise uses a machine learning algorithm. In one configuration, the machine learning algorithm is embedded within the cluster module 114, such as a convolutional neural network (CNN), to perform vehicle clustering over the sensor data 104 from which further information is derived. Of course, in further aspects, the cluster module 114 may employ different machine learning algorithms or implement different approaches for performing the vehicle clustering which can include deep convolutional encoder-decoder architectures, a multi-scale context aggregation approach using dilated convolutions, or another suitable approach that generates vehicle clusters. Whichever particular approach the cluster module 114 implements, the cluster module 114 provides an output with clusters, lateral positions calculated for the clusters, and other vehicle attributes calculated for the clusters.

The trajectory generation system 100 also includes a trajectory module 116 that includes instructions that cause the processor 108 to generate a driving trajectory for a path by connecting nodes on adjacent lane gates that share a vehicle trace. That is, the trajectory generation system 100 iteratively processes each lane gate to 1) identify the lateral positions for the clusters that pass through the lane gate and 2) place a node for each cluster along the target lane gate. Once nodes have been generated at each lane gate, the trajectory module 116 connects those nodes that share a vehicle trace. For example, a target vehicle trace may form part of a first cluster on a first lane gate and a second cluster on a second lane gate. The trajectory module 116 joins nodes representing the first and second clusters, respectively, to form a portion of the driving trajectory. Put another way, the trajectory module 116 tracks a target vehicle trace through lane gates and links the nodes (i.e., representing the lateral position of clusters), of which the vehicle trace is a component. Additional details regarding the connection of nodes on adjacent lane gates to determine a driving trajectory are provided below in connection with FIGS. 4F and 4G.

As the trajectory module 116 determines the driving trajectories for a path based on clustered vehicle traces, regardless of whether there is map data that defines the road and/or path, the trajectory module 116 receives the output of the cluster module 114, which output may indicate the clusters, lateral positions of the clusters, and other vehicle attributes of the clusters from which the driving trajectory and other control information are generated.

In one or more configurations, the trajectory generation system 100 implements one or more machine learning algorithms. As described herein, a machine learning algorithm includes but is not limited to deep neural networks (DNN), including transformer networks, convolutional neural networks, recurrent neural networks (RNN), etc., Support Vector Machines (SVM), clustering algorithms, Hidden Markov Models, and so on. It should be appreciated that the separate forms of machine learning algorithms may have distinct applications, such as agent modeling, machine perception, and so on.

Moreover, it should be appreciated that machine learning algorithms are generally trained to perform a defined task. Thus, the training of the machine learning algorithm is understood to be distinct from the general use of the machine learning algorithm unless otherwise stated. That is, the trajectory generation system 100 or another system generally trains the machine learning algorithm according to a particular training approach, which may include supervised training, self-supervised training, reinforcement learning, and so on. In contrast to training/learning of the machine learning algorithm, the trajectory generation system 100 implements the machine learning algorithm to perform inference. Thus, the general use of the machine learning algorithm is described as inference.

The trajectory generation system 100 functions in cooperation with a communication system 118. Specifically, via the communication system 118, the trajectory generation system 100 receives sensor data 104 from various vehicle communication systems (see element 550 in FIG. 5) and transmits trajectories to the autonomous vehicle. In one embodiment, the communication system 118 communicates according to one or more communication standards. For example, the communication system 118 can include multiple different antennas/transceivers and/or other hardware elements for communicating at different frequencies and according to respective protocols. The communication system 118, in one arrangement, communicates via a communication protocol, such as a WiFi, dedicated short-range communications (DSRC), vehicle-to-infrastructure (V2I), vehicle-to-vehicle (V2V), or another suitable protocol for communicating between the vehicle and other entities in the cloud environment. Moreover, the communication system 118, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle communicating with various remote devices (e.g., a cloud-based server). In any case, the trajectory generation system 100 can leverage various wireless communication technologies to provide communications to other entities, such as members of the cloud-computing environment.

Figure 2:
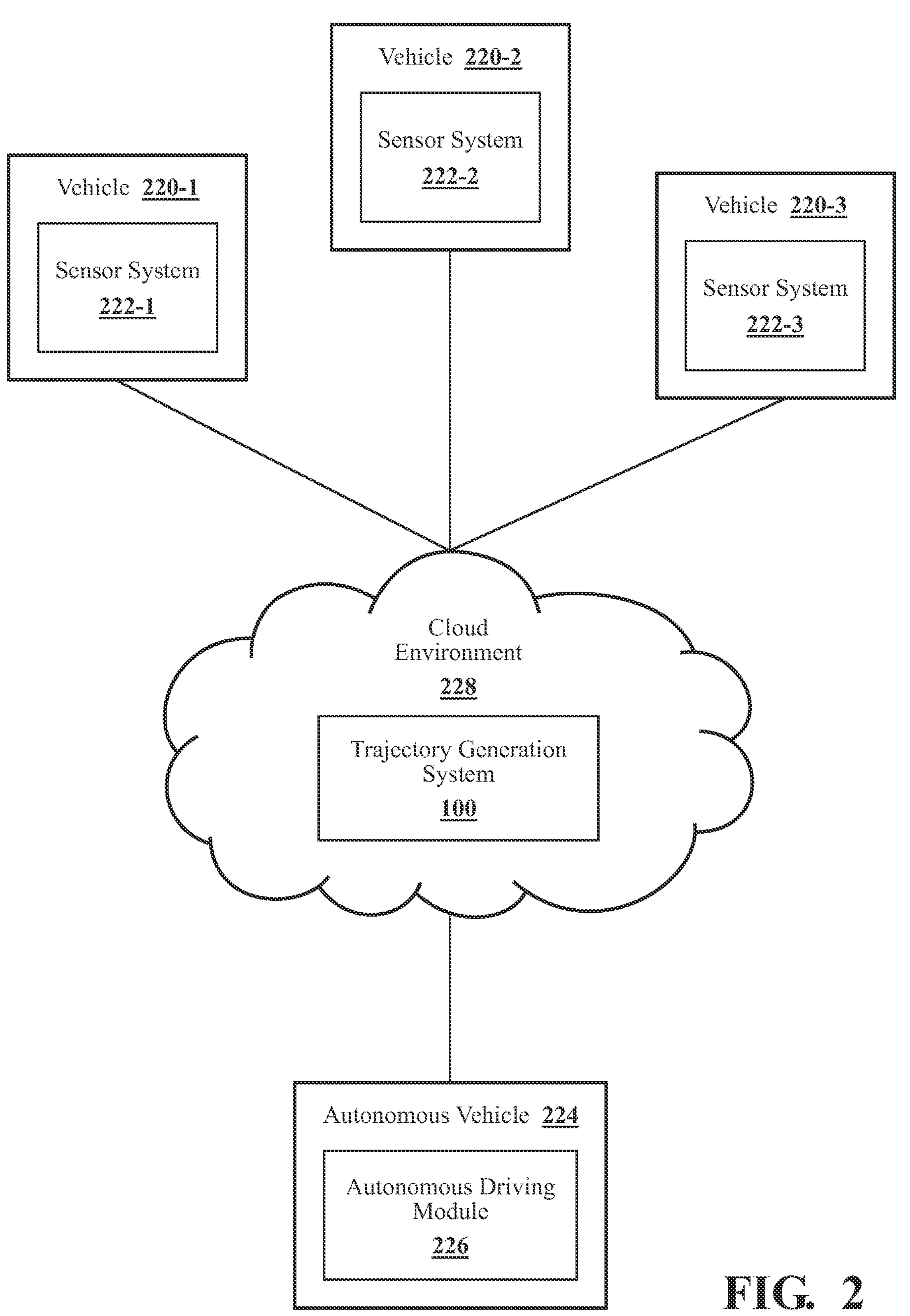
FIG. 2 illustrates one embodiment of the trajectory generation system of FIG. 1 in a cloud-computing environment.

FIG. 2 illustrates one embodiment of the trajectory generation system of FIG. 1 in a cloud-computing environment 228. As described above, in an example, the trajectory generation system 100 is located at a remote system in the cloud environment 228. In this example, the trajectory generation system 100 is connected to various vehicles via the communication system 118 and the individual vehicle communication systems (i.e., communication systems 550 in FIG. 5). For example, the trajectory generation system 100 may acquire sensor data 104 from the sensor systems 222-1, 222-2, and 222-3 of various vehicles 220-1, 220-2, and 220-3. As such, the trajectory generation system 100 generally includes instructions that function to control the processor 108 to receive data inputs from one or more sensors of the vehicles 220. In one embodiment, the inputs are output from various sensors of the sensor systems 222-1, 222-2, and 222-3 of the vehicles 220 and other sensors that monitor the state of the various systems of the vehicles 220. As described above, based on this information, vehicle traces are clustered, lateral positions for various clustered vehicle traces are calculated, driving trajectories are generated, and autonomous vehicle controls are determined.

Also via the communication system 118, the trajectory generation system 100 transmits the calculated driving trajectory for an autonomous vehicle 224 to an autonomous driving module 226 of the autonomous vehicle 224 which, as described below in connection with FIG. 5, controls the various autonomous vehicle 224 systems to maneuver and/or control the autonomous vehicle 224 with little to no driver input.

Figure 3:
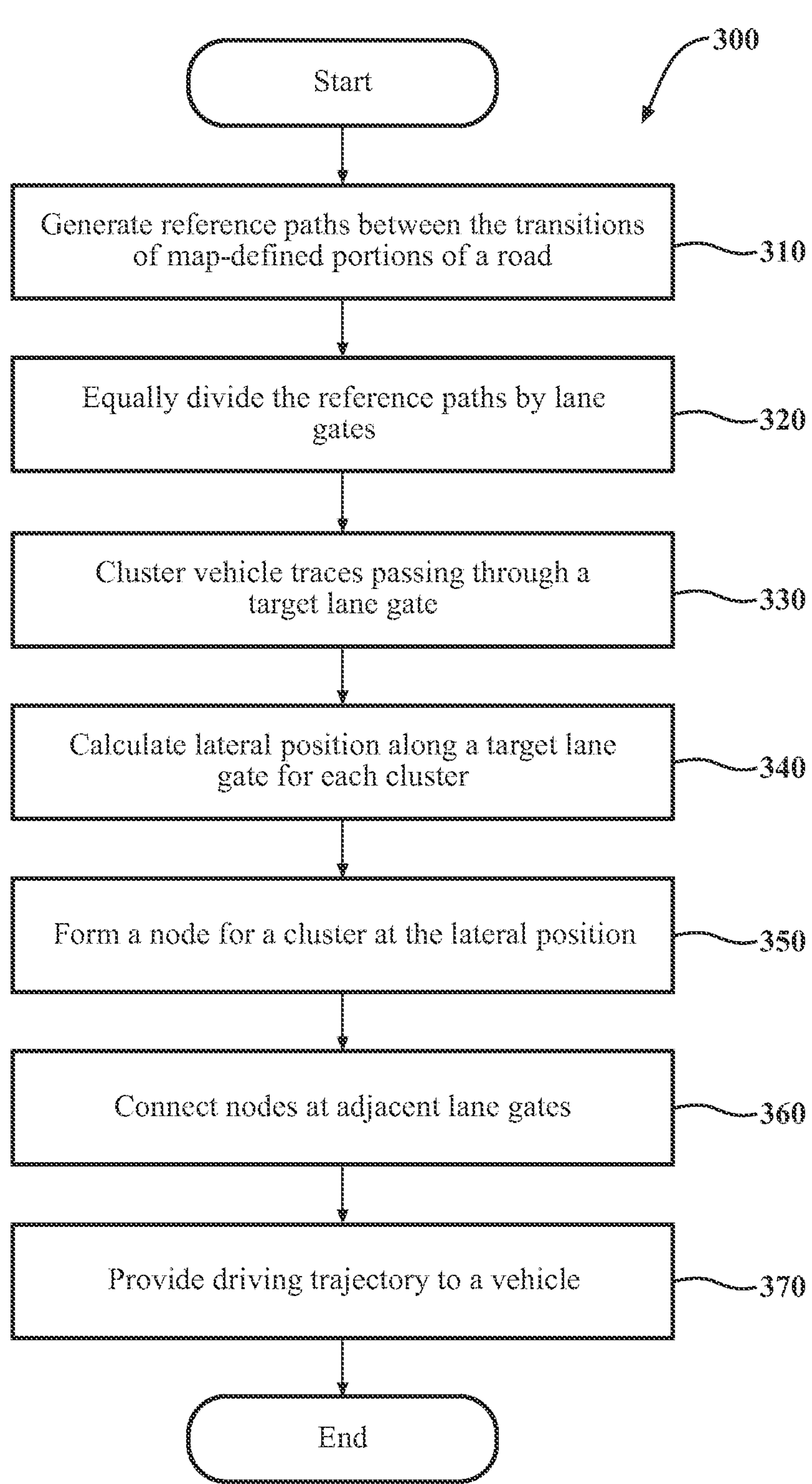
FIG. 3 illustrates a flowchart for one embodiment of a method that is associated with generating vehicle lateral position-based driving trajectories for regions of a road network.

Additional aspects of generating trace-based driving trajectories will be discussed in relation to FIG. 3. FIG. 3 illustrates a flowchart of a method 300 that is associated with generating autonomous or semi-autonomous vehicle driving trajectories based on the traces of gate-based clusters of vehicles. Method 300 will be discussed from the perspective of the trajectory generation system 100 of FIGS. 1 and 2. While method 300 is discussed in combination with the trajectory generation system 100, it should be appreciated that the method 300 is not limited to being implemented within the trajectory generation system 100 but is instead one example of a system that may implement the method 300.

As described above, the vehicle trace clustering is determined, at least in part, based on the lateral position of vehicles 220 and an additional characteristic of the vehicles 220 as the vehicles 220 pass certain demarcations, or lane gates, along their route. Accordingly, the gate module 112 first generates the lane gates where the lateral position and additional characteristic information are collected.

As described above, for portions of the road defined by maps, the trajectory generation system 100 divides the map-defined lanes into equidistant segments, with each lane gate spanning the width of the map-defined lanes. That is, the gate module 112 includes instructions that cause the processor to, for a mapped portion of the road, partition the mapped portion of the road into equidistant segments with a width of the lane gates matching a road width. That is, the processor 108 may segment the map-defined portions of the road by adding transverse lane gates laterally across the map-defined lanes.

However, for unmapped road portions, the trajectory generation system 100 generates reference paths and divides the reference path into equidistant segments via the lane gates. Accordingly, at 310, the trajectory generation system 100 generates reference paths between the transitions of map-defined road portions. For example, a road intersection may be defined by the transitions (i.e., entrances and exits) into and out of the intersection. An index or identifier may identify each transition. The gate module 112 may pair different combinations of transitions and identify those vehicle traces that pass through the paired transitions. That is, the gate module 112 generates trace segments from the vehicle traces, where a trace segment is defined as a contiguous subset of a trace that 1) starts where the trace leaves one map-defined lane polygon and enters an unmapped portion of the road and 2) ends where the trace leaves the unmapped portion of the road and enters another map-defined lane polygon. That is, the trace segments represent the portions of the trace that are found within the unmapped region. The gate module 112 then groups the trace segments based on which pair of lane polygons (i.e., transitions) they connect.

Figure 4B:
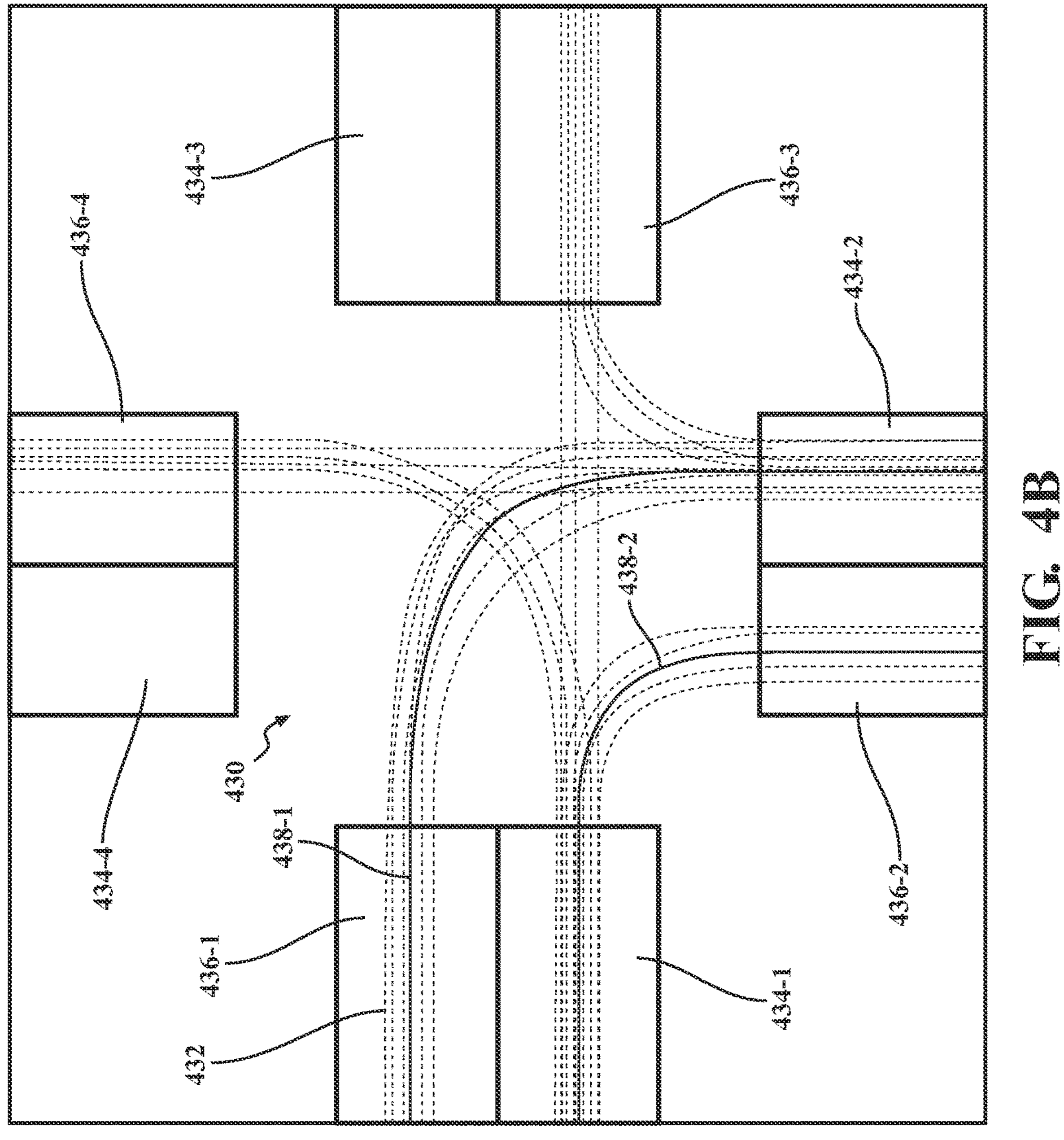

The gate module 112 may estimate a reference path centerline for each trace segment group. That is, the gate module 112 may generate a reference path centerline for each pairing based on some combination, aggregation, or consolidation of the vehicle traces that pass through the paired transitions. Specifically, the gate module 112 may sample each trace segment at n equidistant locations between the start and end of the trace segment, with n being the same for all trace segments in the group. The gate module 112 may then generate a reference path centerline by, for example, averaging the first sampling points for the group, second sampling points for the group, etc., and connecting them to form the reference path centerline. FIGS. 4A-4B described below depict the generation of the reference path centerlines between various transitions of an intersection.

Figure 4C:
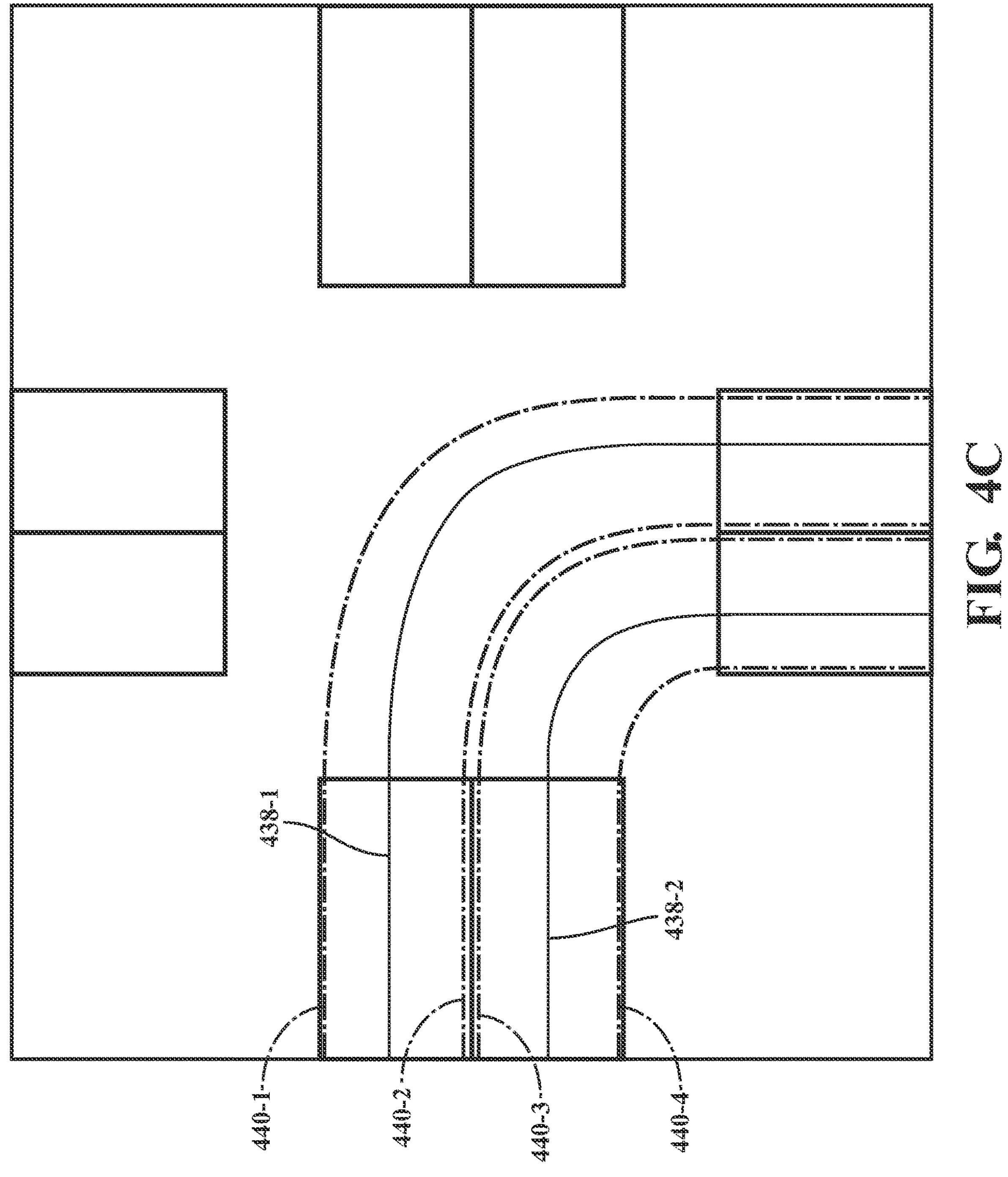

As part of generating the reference paths, the gate module 112 may generate the lane boundaries, which lane boundaries define the edges of the lane gates. Accordingly, the gate module 112 may estimate an offset in either direction of the reference path centerline, which offset may equal half the width of a road lane and generate a right and left boundary at the offset. FIG. 4C, described below, depicts the generation of the lane boundaries for the reference paths.

Figure 4D:
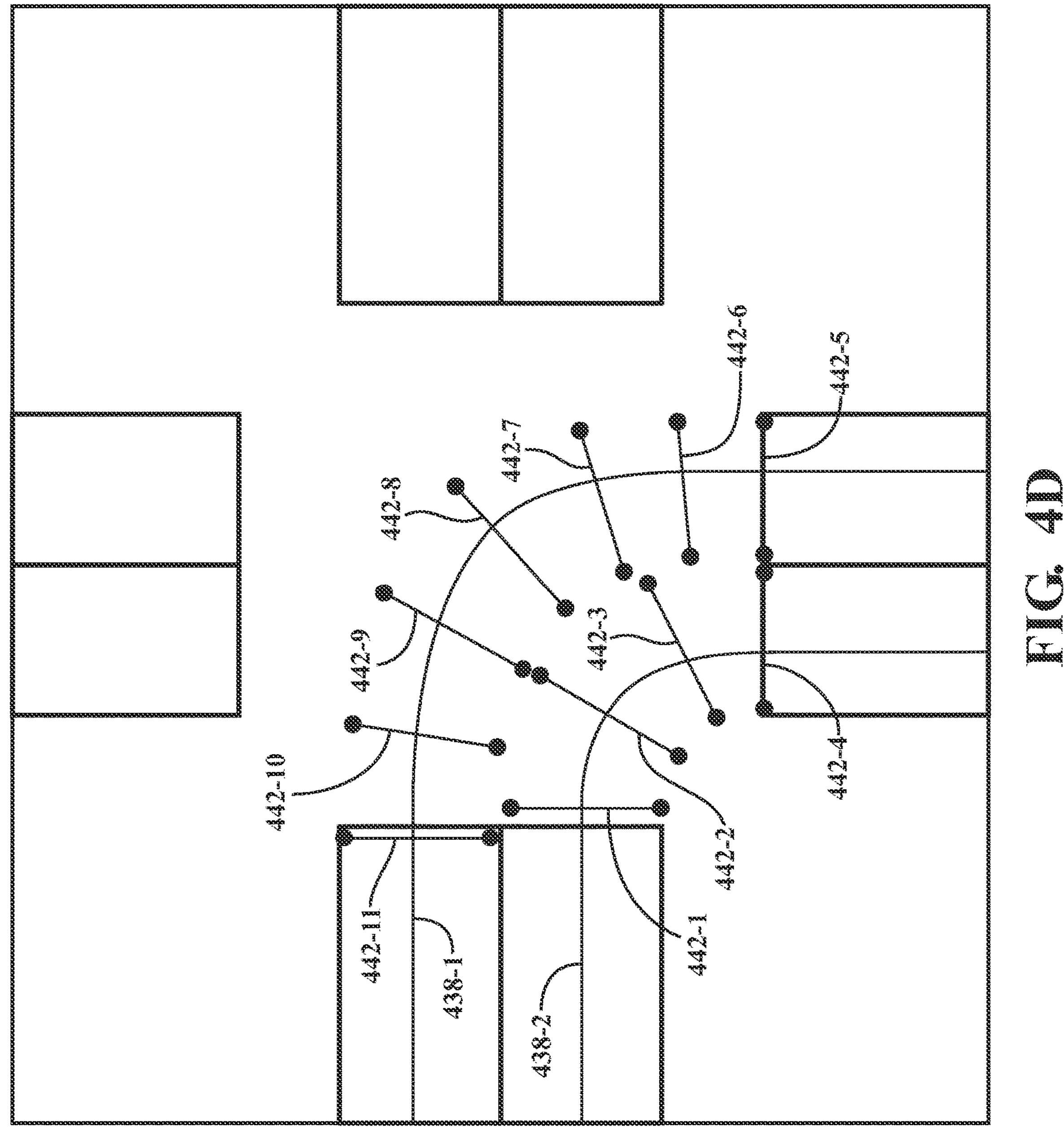

At 320, the trajectory generation system 100 generates a network of lane gates across the reference paths. As described above, the lane gates represent locations along a road where 1) a lateral position and, in some cases, an additional vehicle characteristic indicated in a vehicle trace are sampled, and 2) a lateral position for a cluster of vehicle traces is calculated. Moreover, as described above, the nodes indicating the lateral position of clusters at connected gates are joined by a line segment, which line segment defines a portion of the driving trajectory for an autonomous vehicle 224. To generate the lane gates, the processor 108 may acquire the reference paths and segment the reference paths by adding transverse lane gates laterally across the reference paths. The calculated lane boundaries define the width of the lane gates. The lane gates may be equidistantly spaced along a longitudinal direction of the respective reference path. In an example, each lane gate is indicated with a unique identifier such that the lane gate may be referenced during trace clustering, and trajectory generation. It may be the case that the unique identifier is associated with the path that it traverses. FIG. 4D, described below, depicts the lane gates generated across different reference paths. As such, lane gates are now generated across the routes of the road, both the mapped and unmapped portions of the road.

Next, the cluster module 114 iteratively performs a number of operations for each lane gate, whether on an unmapped or mapped portion of the road. In the present specification, a description of these operations is provided in regard to a target lane gate. Once the operations are completed for a target lane gate, the cluster module 114 proceeds to a different lane gate and performs similar operations.

Accordingly, at 330, the cluster module 114 clusters vehicle traces passing through the target lane gate based on a trace lateral position at the target lane gate. As described above in some examples, the vehicle traces are clustered based on an additional vehicle characteristic, such as the vehicle heading at the target lane gate. That is, as described above, the time-based lateral positions and heading angles of a vehicle 220 may define the route that a vehicle 220 follows through an intersection. Accordingly, by clustering vehicle traces based on these two criteria, the trajectory generation system 100 groups vehicle traces that represent similar routes through the intersection such that a driving trajectory for a particular route may be generated.

As described above, the lateral position of a vehicle 220 as it passes through the lane gate is determined based on sensor data 104, such as GPS coordinates or other positional information collected from the vehicles 220. In an example, as a pre-processing operation, the cluster module 114 may convert the position information (e.g., the GPS coordinates or other positional information) into a format from which the lateral position of the vehicle 220 within the respective lane may be determined. For example, each lane gate may be defined by two endpoints, each of which may be defined by GPS coordinates. The cluster module 114 may compare the GPS coordinates of the lane gate endpoints with the GPS coordinates in the vehicle trace to determine the relative position of the vehicle trace on the lane gate. For example, one end of the lane gate may be identified by a 0, and the other end may be identified by a 1. In this example, the lateral position of the vehicle trace and the cluster may be indicated by a fractional value between 0 and 1, indicative of the relative lateral position of the vehicle trace between the endpoints of the lane gate.

As another example, the cluster module 114 may convert the GPS coordinates in the vehicle trace to a heading angle. That is, the cluster module 114 can determine the difference between GPS coordinates of the vehicle 220 at two different points in time to determine the heading angle. In another example, the sensor data 104 includes the vehicle heading angle.

In either case, the cluster module 114 groups those vehicle traces within a threshold range of one another as measured by these two criteria. For example, those vehicle traces that 1) are within a threshold distance of one another regarding lateral position at the target lane gate and 2) have less than a threshold angular difference regarding heading angle are grouped in a single cluster at that target lane gate.

In another example, the cluster module 114 simultaneously evaluates the two criteria to group those points that are tightly packed together. In this example, rather than considering the criteria (e.g., the lateral position and an additional characteristic such as vehicle speed, weather, vehicle acceleration, heading angle) individually, the cluster module 114 considers both criteria simultaneously and generates one metric indicating proximity, which one metric is based on two input values.

Figure 4E:
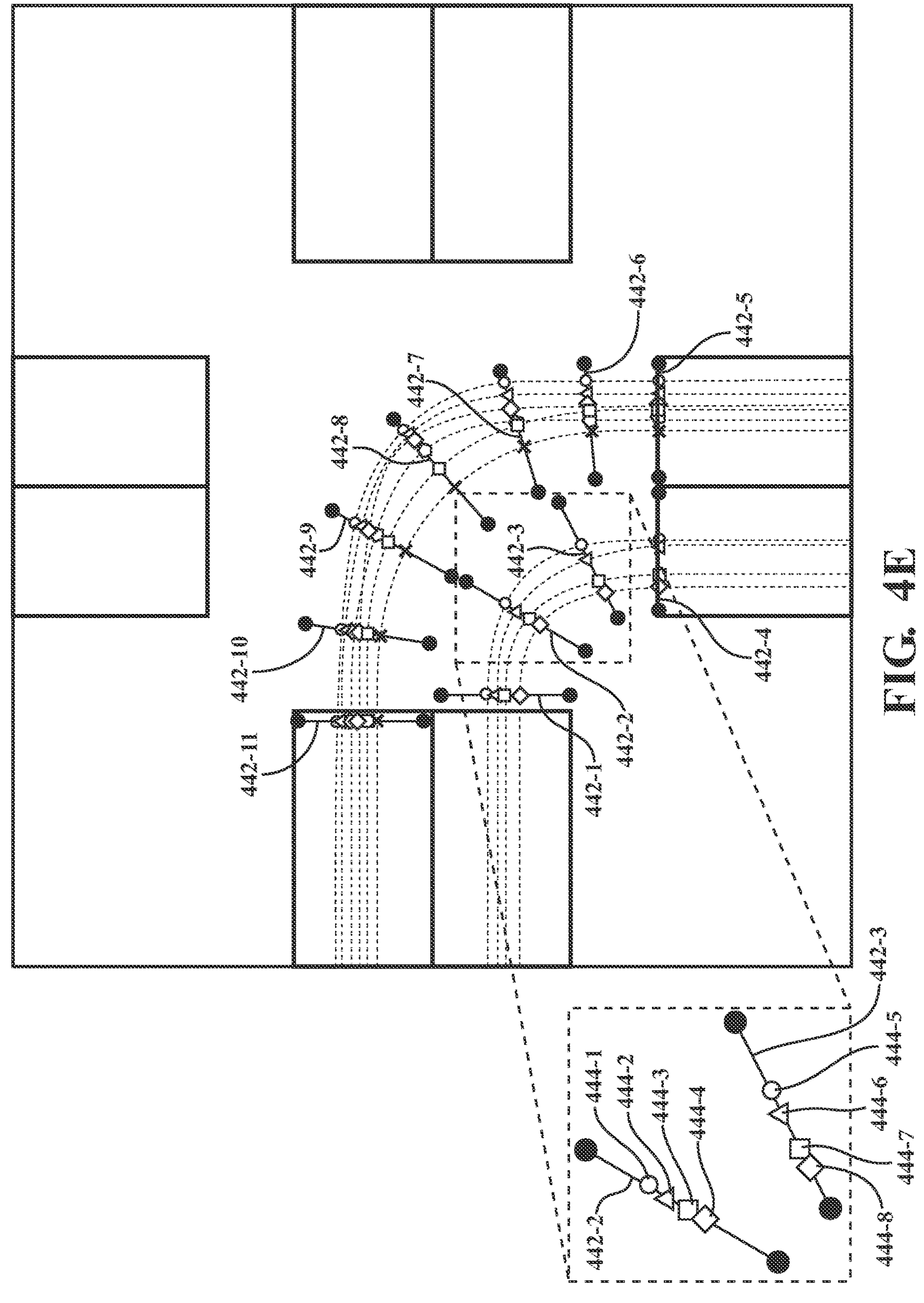
Figure 4F:
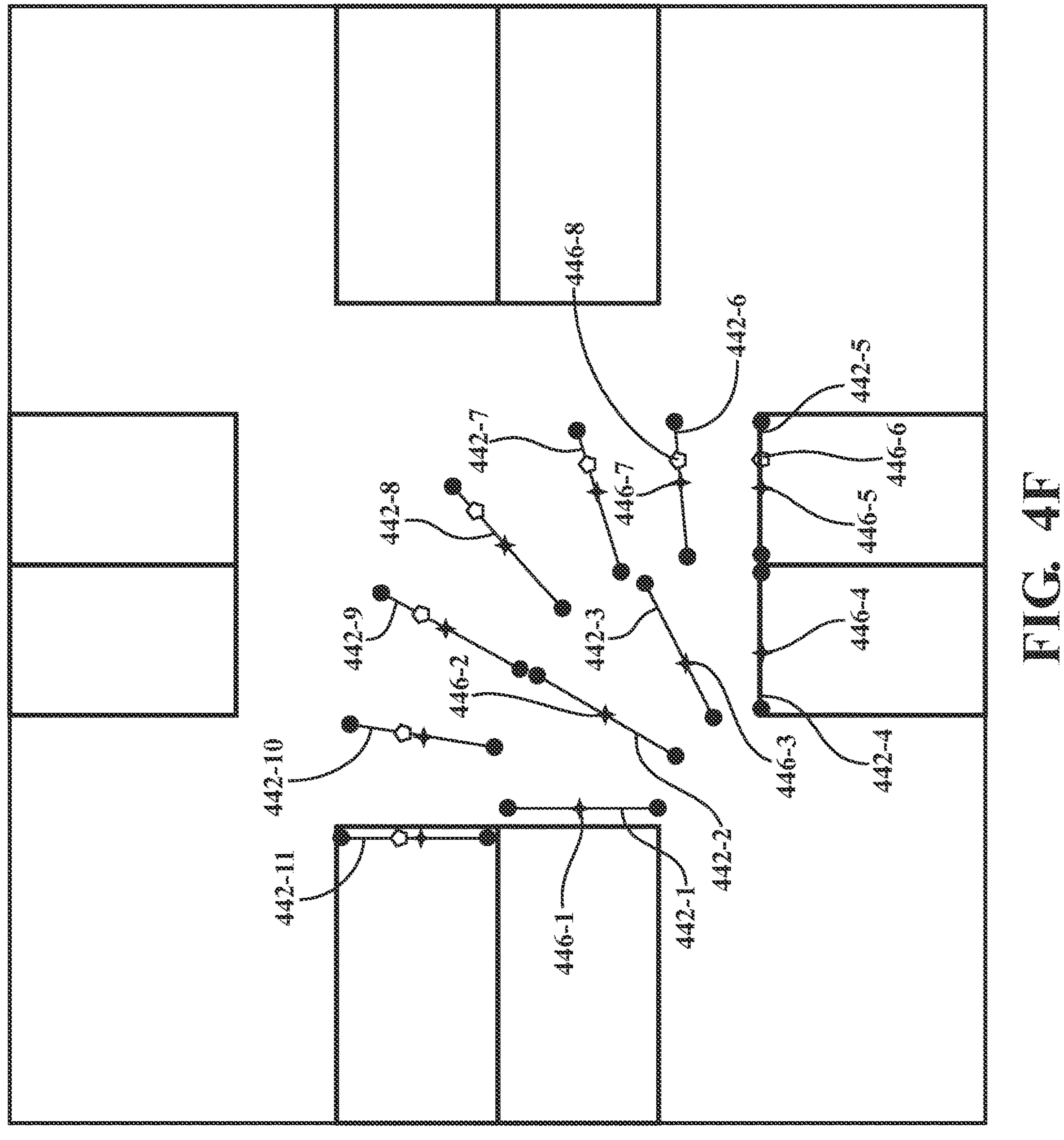

Various specific clustering operations may be executed to cluster the vehicle traces. In one particular example, the cluster module 114 may perform a density-based clustering operation, such as density-based spatial clustering of applications with noise (DBSCAN), to cluster vehicle traces. Specifically, the cluster module 114 receives as input the lateral position data and additional vehicle characteristic data of various manually-operated vehicles collected at a point in time when the vehicle 220 intersects the target lane gate and uses these data points to group various vehicle traces. While particular reference is made to particular clustering operations (e.g., two 1-dimensional clustering operations or one 2-dimensional clustering operation), various clustering operations may be executed to combine vehicle traces traveling along the same route through an unmapped region, such as a road intersection. FIGS. 4E and 4F, described below, depict the clustering of vehicle traces.

At 340, the cluster module 114 calculates a lateral position along the target lane gate for each cluster of vehicle traces. That is, each vehicle 220 that passes through a lane gate has a lateral position. The lateral position is dependent upon the route through the lane gate. For example, a vehicle 220 going straight through an intersection from a lane may be closer to the outside edge of the lane than a vehicle 220 turning from the first lane to head in a different direction. As such, the cluster module 114 considers the lateral position of each vehicle trace in a cluster at a point when the cluster intersects the lane gate and generates a representative lateral position for the cluster. In an example, the representative lateral position may be a selected lateral position from a selected vehicle trace of the cluster, an average of the lateral positions of the vehicle traces of the cluster, a median of the lateral positions of the vehicle traces of the cluster, or any other representation.

At 350, the cluster module 114 places a node on the target lane gate for each cluster, the node being positioned at the representative lateral position for the cluster. In other words, each node is representative of a cluster of vehicle traces and spatially indicates the representative (e.g., averaged, median, or otherwise combined) lateral position of the vehicle traces within that cluster. FIG. 4F depicts various nodes at various lane gates.

At 360, the trajectory module 116 generates a driving trajectory for the path by connecting nodes on adjacent lane gates that share a vehicle trace. That is, the trajectory module 116 links the nodes on adjacent lane gates that define a particular vehicle trace. For example, a target vehicle trace may be grouped into a first cluster at a first lane gate and a second cluster at a second lane gate. In this example, the trajectory module 116 links a first node on the first lane gate (associated with the first cluster) with a second node on the second lane gate (associated with the second cluster). Note that the generated driving trajectory does not necessarily track the vehicle trace. That is, the lateral position of the clusters that represent the target vehicle trace may be different than the lateral position of the target vehicle trace on account of the lateral position for the cluster, considering the lateral position of other vehicle traces. As such, the generated driving trajectory does not simply follow the target vehicle trace but rather follows the representative lateral positions (e.g., averaged, median, etc.) of clusters associated with the target vehicle trace. Additional details regarding linking nodes associated with a target vehicle trace are provided below in connection with FIGS. 4F and 4G.

At 370, the trajectory generation system 100 provides the driving trajectory to a vehicle such as an autonomous vehicle 224. That is, the trajectory generation system 100 includes instructions that cause the processor 108 to guide an autonomous vehicle 224 along the driving trajectory based on the autonomous vehicle track following a route associated with the driving trajectory. For example, an operator may input a target destination for the autonomous vehicle 224, which, combined with the origin of the autonomous vehicle 224, defines a route for the autonomous vehicle 224 through the intersection. An autonomous driving module 226 may associate this route with one of the calculated driving trajectories and guide the autonomous vehicle 224 along such.

For example, upon a determination that the autonomous vehicle 224 is to navigate along a route which, in part, includes turning from a first lane to head in a different direction, the trajectory generation system 100 may provide the autonomous vehicle 224 with the driving trajectory for this route via the communication system 118, which driving trajectory is based on historically traveled routes by manually-operated vehicles.

As such, the trajectory generation system 100 of the present specification generates driving trajectories that are not manually curated but are instead generated based on real-world collected data of actual driving behaviors of human operators and that, therefore, may be more reflective of actual driving behaviors. Moreover, the trajectory generation system 100 of the present specification generates driving trajectories even when map data may not be available for a road segment, as may be the case at road intersections.

In addition to transmitting the driving trajectory, the trajectory generation system 100 may provide other information to the autonomous vehicle 224, which additional information may further define the operational settings of the autonomous vehicle 224. For example, in addition to navigating a particular route along a road segment, motorists may navigate the route at a particular speed and/or operate other vehicle systems in some particular pattern. For example, motorists may turn on the vehicle headlights while driving a particular road segment. Based on this information, a controller of the autonomous vehicle 224 may control the speed of the vehicle and operate vehicle systems in accordance with the operation of the manually-controlled vehicles.

As such, the trajectory generation system 100 may collect this and other data at the various lane gates and provide output to the autonomous vehicle 224 indicative of the patterned behavior at the lane gate such that control systems of the autonomous vehicle 224 may be activated in alignment with the behaviors of human-operated vehicles 220 that have traversed the same roadway. That is, the trajectory generation system 100 includes instructions that, when executed by the processor 108, cause the processor 108 to calculate a vehicle attribute for the cluster at the target lane gate based on vehicle attributes associated with the vehicle trace at the target lane gate and generate time-based vehicle attributes for the path by combining vehicle attributes for the cluster at multiple lane gates along the path.

FIGS. 4A-4G depict the trace and gate-based generation of driving trajectories through a road. Specifically, FIGS. 4A-4G depict the generation of driving trajectories based on a vehicle lateral position and a vehicle heading. However, as described above, the present trajectory generation system 100 may generate the trajectories based on the lateral position and a variety of other vehicle characteristics indicated in the sensor data 104.

FIG. 4A depicts a representation of a road network that includes mapped-defined portions (e.g., entrance transitions 434-1, 434-2, 434-3, and 434-4 and exit transitions 436-1, 436-2, 436-3, and 436-4), each indicated in a solid box and an unmapped portion 430. The trajectory generation system 100 of the present specification generates driving trajectories for both road portions.

As described above, map data 106 that defines a road network may have gaps in some areas of the road network, such as intersections. Some systems that provide autonomous vehicle control and/or navigation may have difficulty providing such through these unmapped portions 430 and may lean towards freestyle navigation or may control the autonomous vehicle 224 based on camera images, LiDAR output, radar output, etc., without any defined path through the unmapped portion 430. The trajectory generation system 100 of the present specification provides accurate, safe, and reliable navigation through intersections and other unmapped portions 430 by basing the navigation on vehicle traces 432 that pass through the unmapped portion. As described above, a vehicle trace 432 records vehicle motion state/behavior (e.g., speed, location, sub-system state, etc.) at various points in time. The vehicle traces 432 and associated data collected as the respective vehicles 220 travel along the roadways may be used to generate driving trajectories. For reference, in FIG. 4A, a single instance of a vehicle trace 432 is indicated with a reference number.

FIG. 4A also illustrates how the route a vehicle 220 takes along the road defines its lateral position and heading angle. For example, a vehicle 220 traveling from the first entrance transition 434-1 towards the fourth exit transition 436-4 may have a different lateral position and heading angle over time as compared to a vehicle 220 traveling from the first entrance transition 434-1 straight to a third exit transition, 436-3. As such, the lateral position and heading angle may serve as reliable indicia of the vehicle route and, as such, are reliable criteria for clustering vehicle traces 432 to derive a driving trajectory for the route.

As described above, the trajectory generation system 100 includes instructions that cause the processor 108 to generate the network of lane gates across a representation of a road, even the unmapped portions 430. To generate the lane gates across the unmapped portion 430, the trajectory generation system 100 generates the reference paths across which the lane gates are positioned.

To generate the reference paths, the gate module 112 identifies transitions between map-defined portions that bound the unmapped portion. That is, vehicles 220 may enter and exit the unmapped portion 430 via transitions. In the specific example depicted in FIG. 4A, vehicles 220 may enter the unmapped portion 430 via entrance transitions 434-1, 434-2, 434-3, and 434-4 and may exit the unmapped portion 430 via exit transitions 436-1, 436-2, 436-3, and 436-4. As described above, the trajectory generation system 100 generates trace segments, each of which is a contiguous subset of a specific trace and 1) starts where a vehicle trace 432 leaves one map-defined lane polygon (e.g., a first entrance transition 434-1) and enters the unmapped portion 430 and 2) ends where a vehicle trace 432 leaves the unmapped portion 430 and enters another map-defined lane polygon (e.g., a second exit transition 436-2). That is, the trace segment represents a portion of the vehicle trace 432 in the unmapped portion 430.

The gate module 112 includes instructions that cause the processor 108 to combine vehicle traces 432 between paired transitions to generate a centerline for a reference path between the paired transitions. That is, the gate module 112 may generate different pairings of entrance and exit transitions and identify vehicle traces 432 that pass from a paired entrance to a paired exit. Put another way, the gate module 112 groups trace segments based on which pair of mapped polygons (e.g., entrance and exit transitions) the trace segments collect. As an example, the gate module 112 may pair the first entrance transition 434-1 with each of the exit transitions 436-1, 436-2, 436-3, and 436-4 and 1) identify those pairings for which there are associated vehicle traces 432 and 2) associate a number of the vehicle traces 432 with each of these paths. Specifically, each transition may be defined by some positional indicia, such as GPS or other geographic coordinates. A vehicle 220 may be determined to have crossed that transition when the GPS or other geographic coordinates of the vehicle 220 cross the geographic coordinates associated with the transition. As such, the trajectory generation system 100 may be able to determine which transitions the vehicle 220 passed as it navigated through the unmapped portion 430.

Similarly, the gate module 112 may pair each of a second entrance transition 434-2, third entrance transition 434-3, and fourth entrance transition 434-4 with each of the exit transitions 436-1, 436-2, 436-3, and 436-4. In each case, the gate module 112 identifies vehicle traces 432 associated with each pairing.

Note that FIG. 4A depicts an example intersection. However, the principles described herein may be applied to different road segments, such as intersections with multi-lane entrances and exits. In this example, vehicle traces 432 may be associated with each lane transition. In a specific example, some lane pairings may be excluded from consideration. For example, some lane pairings may indicate a lane change. To ensure reliable generation of path trajectories, the gate module 112 may exclude transition pairs that indicate a vehicle lane change.

FIG. 4B depicts the reference path centerlines 438 extending between a few different paired transitions of the unmapped portion 430. As described above, once the vehicle traces 432 have been associated with different transition pairings, those vehicle traces 432 associated with a particular pairing may be combined to generate a reference path for that pairing. FIG. 4B depicts two reference path centerlines 438-1 and 438-2 corresponding to the second entrance transition 434-2/first exit transition 436-1 pairing and the first entrance transition 434-1/second exit transition 436-2 pairing. These centerlines 438 indicate a representative path of the vehicle traces 432 that pertain to that pairing. The reference path centerline 438 may be selected in several ways. In one example, the gate module 112 samples each trace segment at n equidistant sampling points between its start and end. The gate module 112 would then average all first sampling points, second sampling points . . . nth sampling points, etc., and connect such to form the reference path centerlines 438. In another example, the gate module 112 may determine the median of the vehicle traces 432 that make up the group. While particular reference is made to particular modalities to generate the reference path centerline 438 from the respective vehicle traces 432, a variety of other modalities may be used to generate the reference path centerline 438. While FIG. 4B depicts reference path centerlines 438-1 and 438-2 for two transition pairings, similar reference path centerlines 438 may be generated for other transitions through the unmapped portion 430.

In FIG. 4C, lane boundaries 440 are depicted for each reference path. For clarity in illustration, the various vehicle traces have been omitted from FIG. 4C. In FIG. 4C, the gate module 112 includes instructions that cause the processor 108 to approximate lane boundaries 440 of the reference path. In an example, the generation of the lane boundaries 440 includes generating a line at a predetermined lateral distance from the reference path centerlines 438, which predetermined lateral distance may be equal to a half a distance of a lane of a roadway. As such, each reference path is defined by its lane boundaries 440. Specifically, a first reference path having a first reference path centerline 438-1 is defined by the first lane boundaries 440-1 and 440-2, and a second reference path having a second reference path centerline 438-2 is defined by the second lane boundaries 440-3 and 440-4. As described above, lane boundaries 440 may define the width of lane gates that traverse the reference path centerlines 438.

FIG. 4D depicts lane gates 442 formed across the representation of the road, some of the lane gates (442-4, 442-5, and 442-11) cross mapped portions of the road while other lane gates (442-1, 442-2, 442-3, 442-6, 442-7, 442-8, 442-9, and 442-10) cross the unmapped portions of the road. As described above, the lane gates 442 are transverse divisions of a lane of a road network. The lane gates 442 that cross the mapped portions of the road are generated by transversing the map-defined lanes of the road. For the unmapped portion 430, the gate module 112 includes instructions that cause the processor 108 to partition the reference paths into equidistant segments, which segment size may be a predetermined distance based on the characteristics of the road network. Note that each lane gate 442 has a width that matches a distance between the lane boundaries 440.

In some examples, the lane gates 442 are indexed by the reference path that they traverse. For example, a second lane gate 442-1 and other lane gates 442-2, 442-3, and 442-4 that are generated across the second reference path centerline 438-2 may include an indication of such in an index or metadata. Similarly, a fifth lane gate 442-5 and other lane gates 442-6, 442-7, 442-8, 442-9, 442-10, and 442-11 generated across the first reference path centerline 438-1 may include an indication of such in an index or metadata. The indices may aid in identifying adjacent lane gates 442 when connecting nodes to form the driving trajectories. For example, it may be the case that vehicle traces 432 cross adjacent lane gates that are associated with different reference paths. However, given that the lane gates 442 of different reference paths are not associated with one another, as indicated by their indices, nodes on these disparate path lane gates 442 are not joined.

FIG. 4E depicts the intersection of vehicle traces 432 with the lane gates 442. That is, as described above, a reference path may be segmented by various lane gates 442. As described above, the lane gates 442 that segment a reference path may be indexed to identify their intersecting reference paths. As a specific example, the lane gates 442 may be indexed via a unique identifier that indicates 1) the reference path segmented and/or 2) the lane gate 442 position relative to other lane gates 442 associated with the same reference path. As an illustration, a first lane gate 442-1 along the second reference path may be identified as 21 indicating its association with the second reference path and its position relative to subsequent lane gates 442 along the second reference path. Similarly, a second lane gate 442-2, a third lane gate 442-3, and a fourth lane gate 442-4 along the second reference path may be identified as 22, 23, and 24, respectively, to indicate their association with the second reference path and their respective position relative to other lane gates 442 along the second reference path. While particular reference is made to a particular index format, other formats may be used to uniquely identify each lane gate 442 along a path and the various lane gates 442 of a road.

As described above, a driving trajectory for a route is defined by the vehicles 220 that have previously navigated that route. This is done by combining or clustering the vehicle trace data associated with those vehicles 220. Rather than continuously combining the vehicle trace data, the cluster module 114 combines the vehicle trace data at specific spatial locations, i.e., the lane gates 442. As such, at each lane gate 442, the cluster module 114 records the lateral position of each vehicle 220 as it passes the lane gate 442. In the example depicted in FIG. 4E, the lateral position of each vehicle trace 432 is indicated by an icon 444. Specifically, FIG. 4E depicts four recorded lateral positions on the second lane gate 442-2 across the second reference path as indicated by the four icons 444-1, 444-2, 444-3, and 444-4 and four recorded lateral positions on the third lane gate 442-3 across the second reference path as indicated by the four icons 444-5, 444-6, 444-7, and 444-8. As described above, the location of the icon 444 is representative of the actual location where the vehicle trace 432 intersected with the associated lane gate 442.

FIG. 4F represents the clustering of the vehicle trace data. In FIG. 4F, each cluster is represented by a symbol. For example, there is one cluster (e.g., star) on the lane gates 442-1, 442-2, 442-3, and 442-4 that fall along the second reference path and two clusters (e.g., star and pentagon) on the lane gates 442-5, 442-6, 442-7, 442-8, 442-9, 442-10, and 442-11 for the first reference path. The clusters represent the vehicle trace data at that lane gate 442 that are sufficiently close to indicate, with a certain confidence, that the associated vehicles 220 likely traveled along the same route through the unmapped portion 430. As depicted in FIG. 4F, there may be multiple clusters per reference path. This may indicate different likely paths for the vehicles traveling along that route. As a specific example, there may be a pothole in the intersection, and the different clusters may indicate different routes vehicles take to avoid the pothole, with some turning on the inside of the pothole while others travel on the outside of the pothole.

Note that FIG. 4F depicts just those clusters that are associated with vehicles that travel from the second entrance transition 434-2 to the first exit transition 436-1 and from the first entrance transition 434-1 to the second exit transition 436-2. However, as depicted in FIG. 4A, there may be additional clusters for a portion of the lane gates 442 associated with either of these lane gate sequences. For example, for those vehicles traveling from the second entrance transition 434-2 to the fourth exit transition 436-4, there may be clusters at each of the fifth lane gate 442-5, sixth lane gate 442-6, seventh lane gate 442-7, and eighth lane gate 442-8. However, other lane gates, such as the ninth lane gate 442-9, tenth lane gate 442-10, and eleventh lane gate 442-11, would not have clusters associated with traces of vehicles traveling from the second entrance transition 434-2 to the fourth exit transition 436-4. In this example, the cluster module 114 may include instructions that cause the processor 108 to generate different quantities of clusters at different lane gates 442.

As described above, vehicle traces 432 may be clustered based on a two-factor or two-dimensional clustering operation. In this example, vehicle traces 432 are not clustered based on lateral position alone but lateral position and another characteristic, such as a heading angle. For example, as described above, a vehicle 220 heading straight through an intersection from a particular entrance transition 434 may have different heading angles over time as compared to a vehicle 220 turning from the particular entrance transition 434 to a perpendicular exit transition 436 of the intersection.

The cluster module 114 may cluster the vehicle traces 432 at the lane gates 442 using any criteria. For example, as described above, the cluster module 114 may rely on some parameter, such as an eps value, to determine whether two trace points are close enough (e.g., based on their lateral position and heading angle) to be considered part of the same cluster. As a specific example, the cluster module 114 clusters together those traces at the lane gate 442 that have 1) a difference in lateral position that is below some threshold and 2) an angular difference between their respective heading angles that is below some predetermined value. The predetermined values by which the lateral positions and heading angles are compared may vary based on application and desired outcomes. In one particular example, the lateral position differences and heading angle differences may be weighted such that a larger distance between one measure (e.g., lateral position difference and heading angle difference) may be permitted in a cluster, provided a distance between the other measure is closer. As described above, the cluster module 114 may implement various clustering operations, such as DBSCAN, to perform the 2-dimensional vehicle trace clustering.

FIG. 4F depicts the nodes 446 that indicate determined lateral positions for clusters at various lane gates 442. For simplicity in illustration, FIG. 4F depicts a few instances of identified nodes 446-1, 446-2, 446-3, 446-4, 446-5, 446-6, 446-7, and 446-8 with reference numbers. However, other nodes 446 are similarly represented in FIG. 4F on various lane gates 442 and positioned on those lane gates 442 at a location representative of the lateral position for the clustered vehicle traces that they represent, albeit without a reference number.

The representative lateral position for a node 446 may be determined in various ways. For example, the representative lateral position for the node 446 may be determined by averaging the lateral positions of the clustered vehicle traces 432 at the target lane gate 442. In another example, the representative lateral position may be the median or mean lateral position of the clustered vehicle traces 432. As such, the cluster module 114 includes instructions that cause the processor 108 to calculate an average or median of lateral positions of the vehicle traces 432 that form the cluster and to use such as the representative lateral distance for the cluster.

As described above, the vehicle trace 432 and the representative lateral position of the node 446 may be defined in various formats, including the absolute geographical position (i.e., latitude and longitude coordinates) or a relative position of the vehicle trace/cluster across the lane gate 442. For example, a start point of a lane gate 442 may be identified by a 0, the end of the lane gate 442 may be identified by a 1, and the node 446 placed at, some fractional distance between 0 and 1.

As described above, the driving trajectory is determined by connecting nodes 446 on adjacent gates that represent a shared vehicle trace 432. In an example, each node 446 and/or cluster may include metadata indicating which vehicle traces 432 it represents on that lane gate 442. The trajectory module 116, reading this metadata, may link those nodes 446 on adjacent lane gates 442 that represent a shared vehicle trace 432. For example, a first vehicle trace following the second reference path may be represented by a first node 446-1 on a first lane gate 442-1 and a second node 446-1 on a second lane gate 442-2. As such, these nodes may be joined, as depicted in FIG. 4G, to form a part of a driving trajectory from the first entrance transition 434-1 to the second exit transition 436-2.

As another example, a second vehicle trace following the first reference path may be represented by a fifth node 446-5 on a fifth lane gate 442-5 and a seventh node 446-7 on a sixth lane gate 442-6. Accordingly, the trajectory module 116 connects the fifth node 446-5 and the seventh node 446-7 to form part of a driving trajectory from the second entrance transition 434-2 to the first exit transition 436-1. In this example, the trajectory module 116 does not connect the fifth node 446-5 to the eighth node 446-8 because there is no vehicle trace represented by both nodes. That is, the basis for joining nodes 446 on adjacent lane gates 442 may be the vehicle traces 432 that are associated with, or represented by, the cluster associated with the nodes 446. In one particular example, the trajectory module 116 includes instructions that cause the processor 108 to traverse along a target vehicle trace 432 through a gate sequence and connect nodes 446 of adjacent lane gates 443 that represent the target vehicle trace 432.

Note that due to the identification of the lane gates 442 by a path identifier, the trajectory module 116 may avoid connecting nodes 446 on adjacent lane gates 442 that are assigned to different reference paths. For example, a particular vehicle trace 432 may cross a lane gate 442 associated with a first reference path and also a lane gate 442 associated with a second reference path. As such, this vehicle trace 432 may be clustered and represented by a node 446 on lane gates 442 associated with different reference paths. However, the trajectory module 116 may avoid connecting these lane gates 442 on dissimilar reference paths based on the metadata (e.g., path identifier) of the lane gates 442 being different.

Figure 4G:
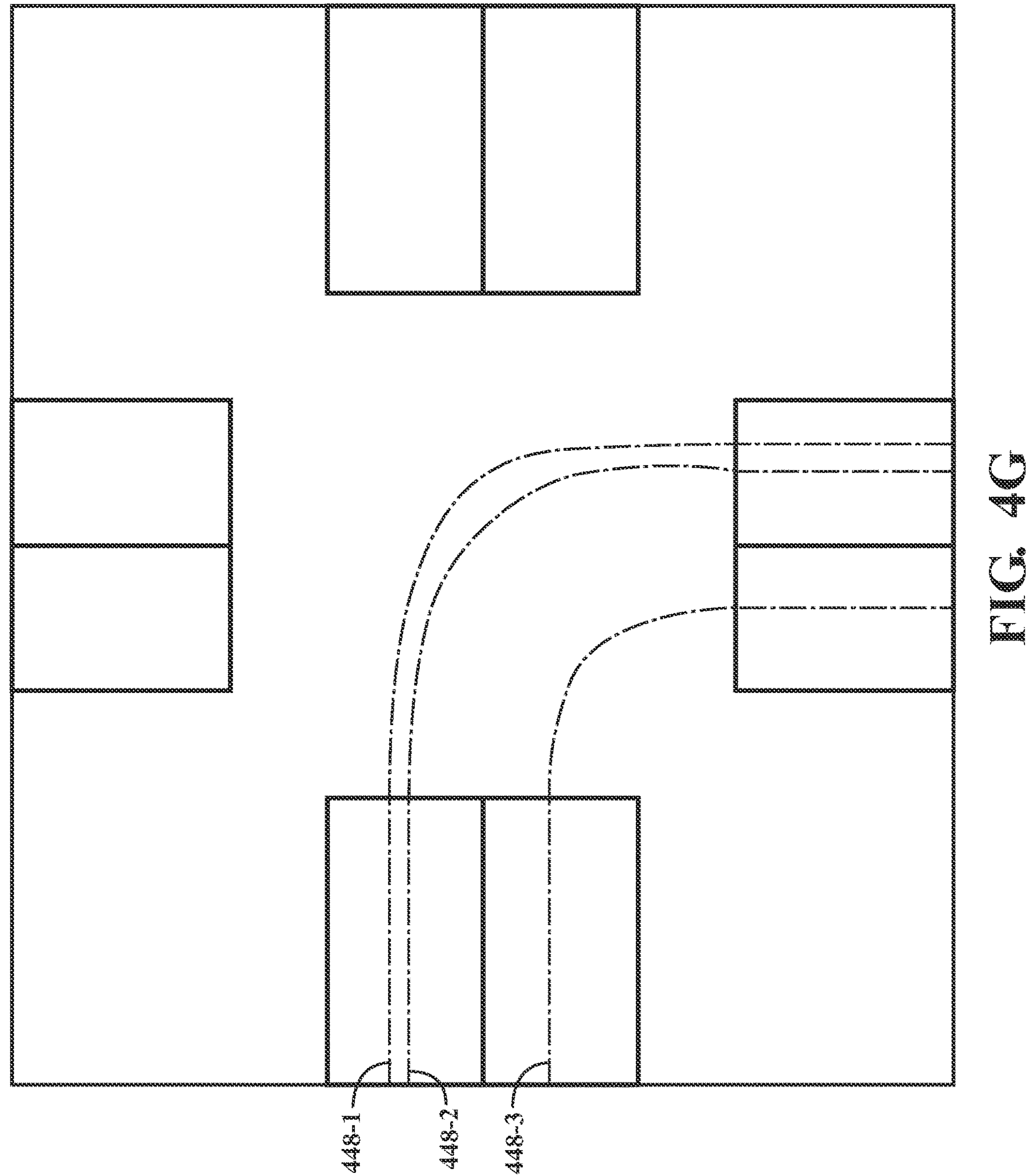

FIG. 4G depicts the driving trajectories 448-1, 448-2, and 448-3 that are generated based on the lateral positions of the respective nodes 446 across multiple lane gates 442. That is, the trajectory module 116 smoothly connects the nodes 446 of adjacent lane gates 442 that are associated with a particular target vehicle trace or multiple target vehicle traces. In this example, the trajectory module 116 includes instructions that cause the processor 108 to place a node 446 on a target lane gate 442 and connect the nodes 446 of connected lane gates 442 that are each associated with a shared vehicle trace. This would be iterated for all lane gates 442, thus providing the driving trajectories 448-1, 448-2, and 448-3 depicted in FIG. 4G.

As described above, there may be multiple trajectories 448 defined for a particular route, as is the case with a first and second driving trajectory 448-1 and 448-2 associated with a route from the second entrance transition 434-2 to the first exit transition 436-1. This may occur, for example, due to road conditions. For example, one driver might avoid a pothole by keeping to the right, whereas another driver might go straight through it. In this example, the autonomous driving module 226 or the trajectory generation system 100 may select a trajectory for this route based on a given or learned set of criteria, for example, smoothness, efficiency, or checking which trajectory is the most traveled.

Figure 5:
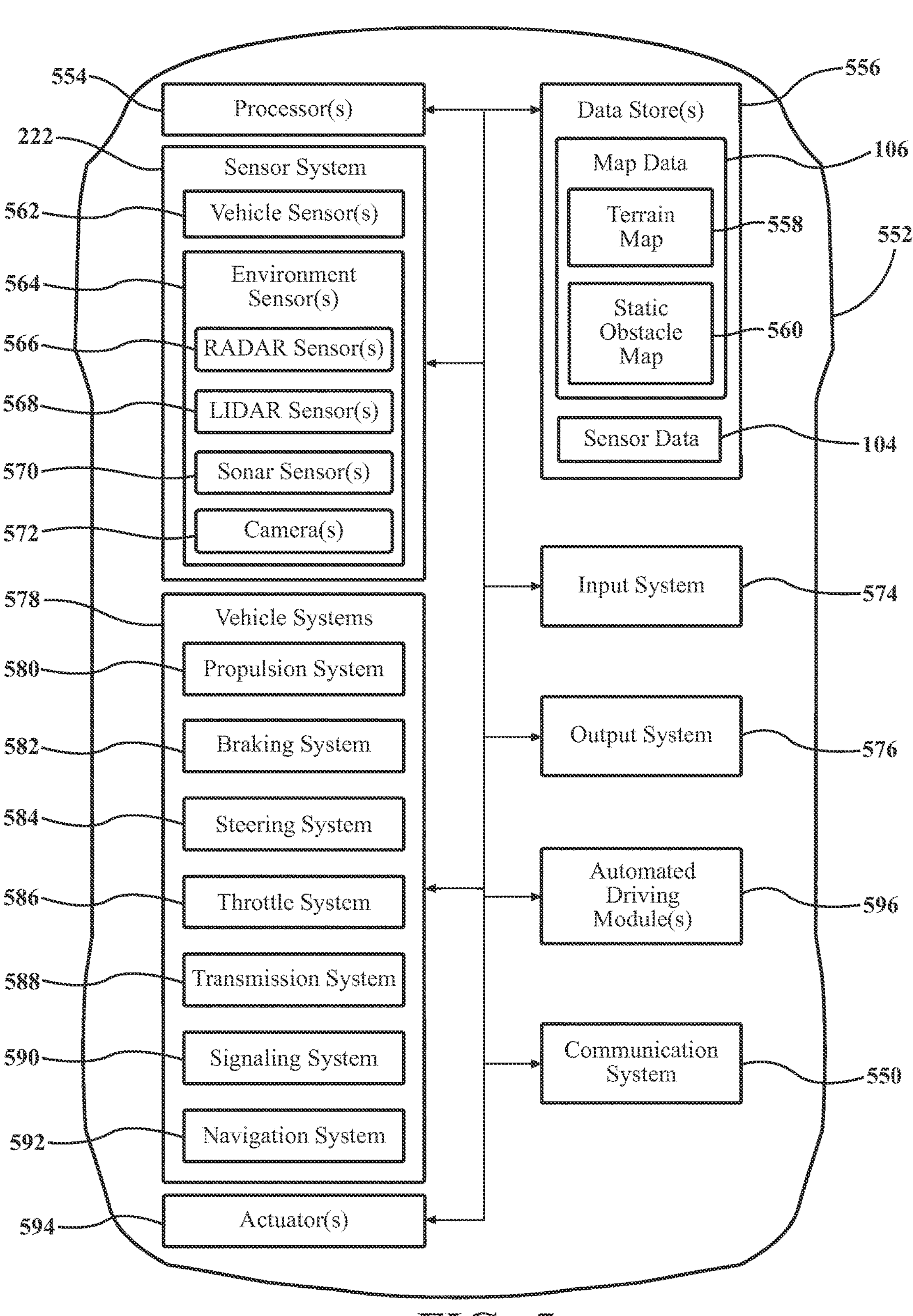
FIG. 5 illustrates one embodiment of a vehicle within which a trace and gate-based driving trajectory for a portion of a road may be implemented.

FIG. 5 illustrates one embodiment of a vehicle 552 within which a trace and gate-based driving trajectory for an unmapped region of a road may be implemented. As described above, the trajectory generation system 100 outputs a trajectory, and potentially other control signals, which are provided to an autonomous vehicle 224, which is an example of the vehicle 552 described herein. The vehicle 552 includes various elements. It will be understood that in various embodiments it may not be necessary for the vehicle 552 to have all of the elements shown in FIG. 5. The vehicle 552 can have different combinations of the various elements shown in FIG. 5. Further, the vehicle 552 can have additional elements to those shown in FIG. 5. In some arrangements, the vehicle 552 may be implemented without one or more of the elements shown in FIG. 5. While the various elements are shown as being located within the vehicle 552 in FIG. 5, it will be understood that one or more of these elements can be located external to the vehicle 552. Further, the elements shown may be physically separated by large distances. For example, as discussed, one or more components of the disclosed system can be implemented within a vehicle while further components of the system are implemented within a cloud-computing environment or other system that is remote from the vehicle 552.

In some instances, the vehicle 552 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 552 as manipulated by a user (e.g., human driver). In one or more arrangements, the vehicle 552 can be a manually-controlled vehicle that is configured to operate in only the manual mode.

In one or more arrangements, the vehicle 552 implements some level of automation in order to operate autonomously or semi-autonomously. As used herein, automated control of the vehicle 552 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 552 along a travel route via a computing system to control the vehicle 552 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 552.

The vehicle 552 includes one or more processors 554. In one or more arrangements, the processor(s) 554 can be a primary/centralized processor of the vehicle 552 or may be representative of many distributed processing units. For instance, the processor(s) 554 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 552.

The vehicle 552 can include one or more data stores 556 for storing one or more types of data. The data store 556 can be comprised of volatile and/or non-volatile memory. Examples of memory that may form the data store 556 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 556 is a component of the processor(s) 554. In general, the data store 556 is operatively connected to the processor(s) 554 for use thereby. The term "operatively connected," as used throughout this description, can include direct or indirect connections, including connections without direct physical contact.

In one or more arrangements, the one or more data stores 556 include various data elements to support functions of the vehicle 552, such as semi-autonomous and/or autonomous functions. Thus, the data store 556 may store map data 106 and/or sensor data 104. The map data 106 includes, in at least one approach, maps of one or more geographic areas. In some instances, the map data 106 can include information about roads (e.g., lane and/or road maps), traffic control devices, road markings, structures, features, and/or landmarks in the one or more geographic areas. The map data 106 may be characterized, in at least one approach, as a high-definition (HD) map that provides information for autonomous and/or semi-autonomous functions.

In one or more arrangements, the map data 106 can include one or more terrain map(s) 558. The terrain map(s) 558 can include information about the ground, terrain, roads, surfaces, and/or other features of one or more geographic areas. The terrain map(s) 558 can include elevation data in the one or more geographic areas. In one or more arrangements, the map data 106 includes one or more static obstacle maps 560. The static obstacle map(s) 560 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 104 is data provided from one or more sensors of the sensor system 222. Thus, the sensor data 104 may include observations of a surrounding environment of the vehicle 552 and/or information about the vehicle 552 itself. In some instances, one or more data stores 556 located onboard the vehicle 552 store at least a portion of the map data 106 and/or the sensor data 104. Alternatively, or in addition, at least a portion of the map data 106 and/or the sensor data 104 can be located in one or more data stores 556 that are located remotely from the vehicle 552.

As noted above, the vehicle 552 can include the sensor system 222. The sensor system 222 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 222 and/or the one or more sensors can be operatively connected to the processor(s) 554, the data store(s) 556, and/or another element of the vehicle 552.

Various examples of different types of sensors will be described herein. However, it will be understood that the embodiments are not limited to the particular sensors described. In various configurations, the sensor system 222 includes one or more vehicle sensors 562 and/or one or more environment sensors. The vehicle sensor(s) 562 function to sense information about the vehicle 552 itself. In one or more arrangements, the vehicle sensor(s) 562 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 552.

As noted, the sensor system 222 can include one or more environment sensors 564 that sense a surrounding environment (e.g., external) of the vehicle 552 and/or, in at least one arrangement, an environment of a passenger cabin of the vehicle 552. For example, the one or more environment sensors 564 sense objects the surrounding environment of the vehicle 552. Such obstacles may be stationary objects and/or dynamic objects. Various examples of sensors of the sensor system 222 will be described herein. The example sensors may be part of the one or more environment sensors 564 and/or the one or more vehicle sensors 562. However, it will be understood that the embodiments are not limited to the particular sensors described. As an example, in one or more arrangements, the sensor system 222 includes one or more radar sensors 566, one or more LIDAR sensors 568, one or more sonar sensors 570 (e.g., ultrasonic sensors), and/or one or more cameras 572 (e.g., monocular, stereoscopic, RGB, infrared, etc.).

Continuing with the discussion of elements from FIG. 5, the vehicle 552 can include an input system 574. The input system 574 generally encompasses one or more devices that enable the acquisition of information by a machine from an outside source, such as an operator. The input system 574 can receive an input from a vehicle passenger (e.g., a driver/operator and/or a passenger). Additionally, in at least one configuration, the vehicle 552 includes an output system 576. The output system 576 includes, for example, one or more devices that enable information/data to be provided to external targets (e.g., a person, a vehicle passenger, another vehicle, another electronic device, etc.).

Furthermore, the vehicle 552 includes, in various arrangements, one or more vehicle systems 578. Various examples of the one or more vehicle systems 578 are shown in FIG. 5. However, the vehicle 552 can include a different arrangement of vehicle systems. It should be appreciated that although particular vehicle systems are separately defined, each or any of the systems or portions thereof may be otherwise combined or segregated via hardware and/or software within the vehicle 552. As illustrated, the vehicle 552 includes a propulsion system 580, a braking system 582, a steering system 584, a throttle system 586, a transmission system 588, a signaling system 590, and a navigation system 592.

The navigation system 592 can include one or more devices, applications, and/or combinations thereof to determine the geographic location of the vehicle 552 and/or to determine a travel route for the vehicle 552. The navigation system 592 can include one or more mapping applications to determine a travel route for the vehicle 552 according to, for example, the map data 106. The navigation system 592 may include or at least provide connection to a global positioning system, a local positioning system or a geolocation system.

In one or more configurations, the vehicle systems 578 function cooperatively with other components of the vehicle 552. For example, the processor(s) 554 and/or automated driving module(s) 596 can be operatively connected to communicate with the various vehicle systems 578 and/or individual components thereof. For example, the processor(s) 554 and/or the automated driving module(s) 596 can be in communication to send and/or receive information from the various vehicle systems 578 to control the navigation and/or maneuvering of the vehicle 552. The processor(s) 554 and/or the automated driving module(s) 596 may control some or all of these vehicle systems 578.

For example, when operating in the autonomous mode, the processor(s) 554 and/or the automated driving module(s) 596 control the heading and speed of the vehicle 552. The processor(s) 554 and/or the automated driving module(s) 596 cause the vehicle 552 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 552 includes one or more actuators 594 in at least one configuration. The actuators 594 are, for example, elements operable to move and/or control a mechanism, such as one or more of the vehicle systems 578 or components thereof responsive to electronic signals or other inputs from the processor(s) 554 and/or the automated driving module(s) 596. The one or more actuators 594 may include motors, pneumatic actuators, hydraulic pistons, relays, solenoids, piezoelectric actuators, and/or another form of actuator that generates the desired control.

As described previously, the vehicle 552 can include one or more modules, at least some of which are described herein. In at least one arrangement, the modules are implemented as non-transitory computer-readable instructions that, when executed by the processor 108, implement one or more of the various functions described herein. In various arrangements, one or more of the modules are a component of the processor(s) 554, or one or more of the modules are executed on and/or distributed among other processing systems to which the processor(s) 554 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 552 may include one or more automated driving modules 596. The automated driving module(s) 596, in at least one approach, receive data from the sensor system 222 and/or other systems associated with the vehicle 552. In one or more arrangements, the automated driving module(s) 596 use such data to perceive a surrounding environment of the vehicle. The automated driving module(s) 596 determine a position of the vehicle 552 in the surrounding environment and map aspects of the surrounding environment. For example, the automated driving module(s) 596 determines the location of obstacles or other environmental features including traffic signs, trees, shrubs, neighboring vehicles, pedestrians, etc.

The automated driving module(s) 596 either independently or in combination with the trajectory generation system 100 can be configured to determine travel path(s), current autonomous driving maneuvers for the vehicle 552, future autonomous driving maneuvers and/or modifications to current autonomous driving maneuvers based on data acquired by the sensor system 222 and/or another source. In general, the automated driving module(s) 596 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing machine-readable instructions that, when executed by the processor, cause the processor to:

generate a network of lane gates across a representation of a road, the lane gates being positioned at successive locations along a path;

for each of at least some target lane gates in the network:

form clusters of vehicle traces passing through the target lane gate, each cluster based on a proximity of trace lateral positions at the target lane gate; and for at least some of the clusters, place a node on the target lane gate at a representative lateral position for the cluster; and generate a driving trajectory for the path by identifying a given vehicle trace that traverses a sequence of adjacent target lane gates and only connecting nodes on the adjacent target lane gates that a correspond to a cluster that includes the given vehicle trace.

2. The system of claim 1, wherein the machine-readable instruction that, when executed by the processor, causes the processor to form the clusters of the vehicle traces passing through the target lane gate comprises a machine-readable instruction that, when executed by the processor, causes the processor to form the clusters of the vehicle traces passing through the target lane gate based on the trace lateral position at the target lane gate and an additional vehicle characteristic indicated by the vehicle traces.

3. The system of claim 2, wherein the additional vehicle characteristic is a trace heading angle at the target lane gate.

4. The system of claim 1, wherein the machine-readable instruction that, when executed by the processor, causes the processor to generate the network of lane gates comprises machine-readable instructions that, when executed by the processor, cause the processor to, for an unmapped portion of the road:

identify transitions between map-defined portions of the road that bound the unmapped portion of the road;

combine vehicle traces between a paired transition to generate a centerline for a reference path between the paired transition;

approximate lane boundaries of the reference path, the lane boundaries are a predetermined distance from the centerline; and partition the reference path into equidistant segments with a width of the lane gates matching a distance between the lane boundaries.

5. The system of claim 1, wherein the machine-readable instruction that, when executed by the processor, causes the processor to generate the network of lane gates comprises a machine-readable instruction that, when executed by the processor, causes the processor to, for a mapped portion of the road, partition the mapped portion of the road into equidistant segments with a width of the lane gates matching a road width.

6. The system of claim 1, wherein the machine-readable instruction that, when executed by the processor, causes the processor to form the clusters of the vehicle traces passing through the target lane gate comprises a machine-readable instruction that, when executed by the processor, causes the processor to generate different quantities of clusters at different lane gates.

7. The system of claim 1, wherein the machine-readable instruction that, when executed by the processor, causes the processor to place the node for the cluster on the target lane gate at the representative lateral position for the cluster comprises a machine-readable instruction that, when executed by the processor, causes the processor to calculate an average or median of lateral positions of vehicle traces that form the cluster.

8. The system of claim 1, wherein the machine-readable instructions further comprise machine-readable instructions that, when executed by the processor, cause the processor to:

calculate a vehicle attribute for the cluster at the target lane gate based on vehicle attributes associated with the vehicle traces at the target lane gate; and generate time-based vehicle attributes for the path by combining vehicle attributes for the cluster at multiple lane gates along the path.

9. The system of claim 1, wherein the machine-readable instructions further comprise machine-readable instructions that, when executed by the processor, cause the processor to guide an autonomous vehicle along the driving trajectory based on an autonomous vehicle track being grouped with the cluster.

10. A non-transitory machine-readable medium comprising instructions that, when executed by a processor, cause the processor to:

generate a network of lane gates across a representation of a road, the lane gates being positioned at successive locations along a path;

for each of at least some target lane gates in the network:

form clusters of vehicle traces passing through the target lane gate, each cluster based on a proximity of trace lateral positions at the target lane gate; and for at least some of the clusters, place a node on the target lane gate at a representative lateral position for the cluster; and generate a driving trajectory for the path by identifying a given vehicle trace that traverses a sequence of adjacent target lane gates and only connecting nodes on the adjacent target lane gates that a correspond to a cluster that includes the given vehicle trace.

11. The non-transitory machine-readable medium of claim 10, wherein the machine-readable instruction that, when executed by the processor, causes the processor to form clusters of the vehicle traces passing through the target lane gate comprises a machine-readable instruction that, when executed by the processor causes the processor to form clusters of the vehicle traces passing through the target lane gate based on the trace lateral position at the target lane gate and a trace heading angle at the target lane gate.

12. The non-transitory machine-readable medium of claim 10, wherein the instruction that, when executed by the processor, causes the processor to generate the network of lane gates comprises instructions that, when executed by the processor, cause the processor to, for an unmapped portion of the road:

identify transitions between map-defined portions of the road that bound the unmapped portions of the road;

combine vehicle traces between a paired transition to generate a centerline for a reference path between the paired transition;

approximate lane boundaries of the reference path, the lane boundaries are a predetermined distance from the centerline; and partition the reference path into equidistant segments with a width of the lane gates matching a distance between the lane boundaries.

13. The non-transitory machine-readable medium of claim 10, wherein the instruction that, when executed by the processor, causes the processor to generate the network of lane gates comprises an instruction that, when executed by the processor, causes the processor to, for a mapped portion of the road, partition the mapped portion of the road into equidistant segments with a width of the lane gates matching a road width.

14. A method, comprising:

generating a network of lane gates across a representation of a road, the lane gates being positioned at successive locations along a path;

for each of at least some target lane gates in the network:

forming clusters of vehicle traces passing through the target lane gate based on a proximity of trace lateral positions at the target lane gate; and for at least some of the clusters, placing a node on the target lane gate at a representative lateral position for the cluster; and generating a driving trajectory for the path by identifying a given vehicle trace that traverses a sequence of adjacent target lane gates and only connecting nodes on the adjacent target lane gates that correspond to a cluster that includes the given vehicle trace.

15. The method of claim 14, wherein forming the clusters of the vehicle traces passing through the target lane gate comprises forming the clusters of the vehicle traces passing through the target lane gate based on the trace lateral position at the target lane gate and a trace heading angle at the target lane gate.

16. The method of claim 14, wherein generating the network of lane gates comprises, for an unmapped portion of the road:

identifying transitions between map-defined portions of the road that bound the unmapped portions of the road;

combining vehicle traces between a paired transition to generate a centerline for a reference path between the paired transition;

approximating lane boundaries of the reference path, the lane boundaries are a predetermined distance from the centerline; and partitioning the reference path into equidistant segments with a width of the lane gates matching a distance between the lane boundaries.

17. The method of claim 14, wherein generating the network of lane gates comprises, for a mapped portion of the road, partitioning the mapped portion of the road into equidistant segments with a width of the lane gates matching a road width.

18. The method of claim 14, further comprising guiding an autonomous vehicle along the driving trajectory based on an autonomous vehicle track being grouped with the cluster.

* * * * *